United States Patent
Ai et al.

(10) Patent No.: US 10,077,823 B2
(45) Date of Patent: Sep. 18, 2018

(54) MULTIMODE ELECTROMECHANICAL VARIABLE SPEED TRANSMISSION APPARATUS AND METHOD OF CONTROL

(71) Applicants: Xiaolin Ai, Beijing (CN); Rui Xue, Beijing (CN); Zhonghe Xue, Beijing (CN); Xiaozhi Ai, Baoan (CN)

(72) Inventors: Xiaolin Ai, Beijing (CN); Rui Xue, Beijing (CN); Zhonghe Xue, Beijing (CN); Xiaozhi Ai, Baoan (CN)

( * ) Notice: Subject to any disclaimer, the term of this patent is extended or adjusted under 35 U.S.C. 154(b) by 618 days.

(21) Appl. No.: 14/694,881

(22) Filed: Apr. 23, 2015

(65) Prior Publication Data

US 2015/0292600 A1 Oct. 15, 2015

Related U.S. Application Data

(63) Continuation-in-part of application No. 14/249,845, filed on Apr. 10, 2014, now Pat. No. 9,108,624, (Continued)

(30) Foreign Application Priority Data

Dec. 4, 2007 (CN) .......................... 2007 1 0195199

(51) Int. Cl.
*F16H 3/72* (2006.01)
*B60W 10/02* (2006.01)
(Continued)

(52) U.S. Cl.
CPC ............. *F16H 3/728* (2013.01); *B60K 6/365* (2013.01); *B60K 6/445* (2013.01); *B60K 6/543* (2013.01);
(Continued)

(58) Field of Classification Search
None
See application file for complete search history.

(56) References Cited

U.S. PATENT DOCUMENTS

| | | |
|---|---|---|
| 6,793,600 B2 | 9/2004 | Hiraiwa |
| 7,223,200 B2 | 5/2007 | Kojima |

(Continued)

FOREIGN PATENT DOCUMENTS

| | | |
|---|---|---|
| CN | 1563743 A | 1/2005 |
| CN | 1800681 A | 7/2006 |
| CN | 101007533 A | 8/2007 |

*Primary Examiner* — Colby M Hansen
(74) *Attorney, Agent, or Firm* — Lucas & Mercanti, LLP

(57) ABSTRACT

The current invention discloses a multi-mode electro-mechanical variable speed transmission. The transmission includes an input shaft, an output system, planetary gear set having at least three braches each represents a co-axial rotating member, two electric machines along with the associated controllers for the electric machines, and a clutch. The first branch couples to the first electric machine with a constant speed ratio; the second branch couples to the output system with a constant speed ratio; and the third branch couples to the input shaft with a constant speed ratio; the second electric machine selectively couples to two different the branches of the planetary gear set with two different constant speed ratios, respectively. The multi-mode electro-mechanical variable speed transmission is capable of providing multiple operation modes including two electric drive modes and two power split operation modes. Different operation modes cover different speed ratio regimes and are suitable for different power requirements. At the mode switching point, the corresponding clutch or clutches is automatically synchronized. This avoids shock loads during operation mode switching. The transmission is capable of providing operations with at least a fixed output to input speed ratio.

23 Claims, 13 Drawing Sheets

Related U.S. Application Data which is a continuation of application No. 12/744,584, filed as application No. PCT/CN2008/001945 on Nov. 28, 2008, now Pat. No. 8,734,281.

(51) Int. Cl.

| | |
|---|---|
| *B60K 1/02* | (2006.01) |
| *B60K 6/543* | (2007.10) |
| *B60K 6/445* | (2007.10) |
| *B60K 6/365* | (2007.10) |
| *B60K 6/547* | (2007.10) |
| *B60W 10/08* | (2006.01) |
| *B60W 10/11* | (2012.01) |
| *B60L 11/12* | (2006.01) |
| *B60L 11/14* | (2006.01) |
| *B60L 11/18* | (2006.01) |
| *B60L 15/20* | (2006.01) |
| *F16H 37/08* | (2006.01) |
| *F16H 37/10* | (2006.01) |

(52) U.S. Cl.
CPC ............ *B60K 6/547* (2013.01); *B60L 11/123* (2013.01); *B60L 11/14* (2013.01); *B60L 11/1864* (2013.01); *B60L 15/2054* (2013.01); *B60W 10/02* (2013.01); *B60W 10/08* (2013.01); *B60W 10/11* (2013.01); *B60K 1/02* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/486* (2013.01); *F16H 2037/0873* (2013.01); *F16H 2037/101* (2013.01); *F16H 2037/103* (2013.01); *F16H 2037/104* (2013.01); *F16H 2200/0034* (2013.01); *F16H 2200/2005* (2013.01); *F16H 2200/2007* (2013.01); *F16H 2200/2023* (2013.01); *F16H 2200/2035* (2013.01); *F16H 2200/2038* (2013.01); *F16H 2200/2064* (2013.01); *F16H 2200/2082* (2013.01); *F16H 2200/2094* (2013.01); *F16H 2200/2097* (2013.01); *Y02T 10/6217* (2013.01); *Y02T 10/6239* (2013.01); *Y02T 10/645* (2013.01); *Y02T 10/7005* (2013.01); *Y02T 10/7061* (2013.01); *Y02T 10/7077* (2013.01); *Y02T 10/72* (2013.01); *Y02T 10/7275* (2013.01); *Y10S 903/911* (2013.01); *Y10T 477/23* (2015.01); *Y10T 477/26* (2015.01)

(56) References Cited

U.S. PATENT DOCUMENTS

| | | | |
|---|---|---|---|
| 7,645,205 B2 | 1/2010 | Holmes | |
| 7,972,237 B2 | 7/2011 | Ota | |
| 8,277,350 B2 | 10/2012 | Ai | |
| 8,460,142 B2 * | 6/2013 | Wittkopp | B60K 6/365 475/271 |
| 2001/0008859 A1 | 7/2001 | Masaki | |
| 2003/0073534 A1 | 4/2003 | Oshidari | |
| 2006/0111212 A9 | 5/2006 | Ai | |
| 2006/0276288 A1 | 12/2006 | Iwanaka | |
| 2007/0099738 A1 | 5/2007 | Holmes | |
| 2007/0129198 A1 | 6/2007 | Atarashi | |
| 2008/0103002 A1 | 5/2008 | Holmes | |
| 2008/0200296 A1 | 8/2008 | Holmes | |
| 2009/0209381 A1 | 8/2009 | Xiaolin | |

* cited by examiner

MULTIMODE ELECTROMECHANICAL VARIABLE SPEED TRANSMISSION APPARATUS AND METHOD OF CONTROL

CROSS-REFERENCE TO RELATED APPLICATIONS

This application is a Continuation-in-Part of U.S. application Ser. No. 14/249,845 filed on Apr. 10, 2014, which is a Continuation of U.S. application Ser. No. 12/744,584 filed May 25, 2010 (now U.S. Pat. No. 8,734,281 issued May 27, 2014), which is a 371 Application of PCT/CN2008/001945 filed Nov. 28, 2008, which claims priority of Chinese Patent Application 200710195199.8 filed Dec. 4, 2007, all of which are incorporated herein by reference.

BACKGROUND OF THE INVENTION

The invention is related to a multi-mode electro-mechanical variable speed transmission in a powertrain, and to a method of operating the transmission and the powertrain. It is applicable to a wide variety of vehicles and power equipment.

To reduce fuel consumption and emission, hybrid vehicles combine an electric power plant with a conventional internal combustion engine. The internal combustion engine operates in a certain range of speed and power. Inside this range, there usually exists a smaller regime where the engine achieves the best performance. On the other hand, however, driving conditions vary enormously, not only in wheel speed but also in driving torque at the drive wheels. A combination of a given speed and torque defines a power state. Selectively operating the internal combustion engine and matching its power state with that of the drive wheels are the primary functions for a hybrid transmission.

The development of hybrid technology provides new avenues for achieving improved operation and match of power state of the internal combustion engine with the drive wheels. Among various power-train architectures, a well-known design is the electro-mechanical continuous variable transmission, known as Toyota hybrid system, or THS. THS allows for electric propulsion at low power and slow speed operation and turns on the engine in hybrid operation when vehicle speed and or power demands exceed certain thresholds. In the hybrid operation, THS splits the input power into two paths of different nature. Part of the input power passes through a so-called mechanical power path which is comprised of gears and shafts; the rest of the input power passes through an electric power path which contains electric machines and inverters. The device used to split the power is a simple planetary gear system. THS offers only one power splitting mode and provides a single output to input speed ratio node point SR. When the transmission operates at a speed ratio higher than the speed ratio node point, internal power circulation occurs. One of the power paths sees more power than that is transmitted through the transmission, which reduces power transmission efficiency. This, to a large extent, constrains the effective operating speed ratio of the transmission. For high power vehicle applications, the power ratings for the electric machines have to be increased significantly. In the electric drive mode, only one of the electric machines provides motive power. This makes THS not suitable for all electric drive in power demanding applications. An example of such an application is all electric range (AER) plug-in hybrid configurations where the vehicles operate in pure electric mode until the battery charge is depleted below a predetermined threshold.

BRIEF SUMMARY OF INVENTION

One of the objectives of current invention is to overcome the aforementioned drawbacks of the prior art by providing a novel multi-mode electro-mechanical variable speed transmissions with much improved fuel efficiency and performance characteristics. The transmission can operate under at least two different power splitting modes, offering higher power transmission efficiency by avoiding internal power circulation. The transmission is capable of providing continuously variable output to input speed ratio and independent power regulation, which significantly extends the operational speed ratio range. The transmission may also be operated in two pure electric modes with much improved acceleration performance and in two fixed speed ratio modes with maximum transmission efficiency.

To achieve above objectives, the current invention provides a multi-mode electro-mechanical variable speed transmission including a gear system, a stationary member, an input shaft, an output system, a clutch, and two electric machines along with their electric drives and controllers. The gear system further includes two planetary gear sets each having at least three co-axial rotatable members or components.

For those skilled in the art, a planetary gear set can be described and understood in a lever diagram format. A lever diagram is a schematic representation of the components of a planetary gear set and defines kinematic and dynamic relationships between the components. It contains a lever or a bar and a number of knots. Each knot corresponds to a co-axial rotatable component of the planetary gear set. The inter-distances between the knots are determined by gear ratio or ratios of the planetary gear set. The knots from one end of the lever to the other are referred consecutively as the first, the second, third knots and so on. The rotation speed of the co-axial rotatable components of the planetary gear set are represented by vectors that start from the corresponding knots and are perpendicular to the lever. A multi-knot lever diagram has two degrees of freedom: the speeds of any two knots uniquely determine the speed of the remaining knots. The ends of all rotation speed vectors on a lever diagram lay on a straight line.

A lever with three knots represents a three-shaft planetary gear set, also known as a three-branch gear set having three co-axial rotatable components. FIG. 1 shows a three-knot lever diagram. The three knots from left to right are referred to as the first ($KN_{11}$), the second ($KN_{12}$) and the third ($KN_{13}$) knots, respectively. Each knot corresponds to a branch or a co-axial rotatable component of the planetary gear set. The three branches are referred to, according to their corresponding knots, as the first, the second and the third branches of the planetary gear set. The inter-distance between the first and second knots is one unit in length, the inter-distance between the second and third knots is $K_a$ unit in length. $K_a$ is the gear teeth ratio (also known as gear ratio) of ring gear to sun gear for a simple planetary gear set.

A lever with four knots represents a four-shaft planetary gear set, also known as a four-branch gear set having four co-axial rotatable components. FIG. 2 shows a four-knot lever diagram. The four knots from left to right are referred to as the first ($KN_{21}$), the second ($KN_{22}$), the third ($KN_{23}$) and the fourth ($KN_{24}$) knots, respectively. Each knot corresponds to a branch or a co-axial rotatable component of the planetary gear set. The four branches are referred to, according to their corresponding knots, as the first, the second, the third and the fourth branches of the planetary gear set. The inter-distance between the first and third knots is $K_b$ unit in length; the inter-distance between the second and third knots is $K_a$ unit in length and the inter-distance between the third and fourth knots is one unit in length, where $K_a$ and $K_b$ are characteristic gear teeth ratios of the four-branch planetary gear set.

The gear system of the present invention is configured with a first three-knot lever and a second four-knot lever. The first knot of the first lever couples to the stationary member and the second knot of the first lever couples to the second knot of the second lever. The gear system is connected to the input shaft, the output system, and to the first and second electric machines in the following configuration (see FIG. 3): the third knot of the first lever selectively connects and disconnects the second electric machine through the clutch; the first knot of the second lever connects to the first electric machine; the second knots of the first and second levers connect to output system; the third knot of the second lever connects to the input shaft and the fourth knot of the second lever selectively connects to and disconnects from the second electric machine.

Alternatively, the gear system is configured with a first three-knot lever and a second three-knot lever. The first knot of the first lever couples to the stationary member and the second knot of the first lever couples to the second knot of the second lever. The gear system is connected to the input shaft, the output system, and to the first and second electric machines in the following configuration: the third knot of the first lever selectively connects to and disconnects from the second electric machine through the clutch; the first knot of the second lever connects to the first electric machine; the second knots of the first and second levers connect to output system; the third knot of the second lever connects to the input shaft and selectively connects to and disconnects from the second electric machine.

The multi-mode electro-mechanical variable speed transmission may further include a counter shaft. The rotatable connection between the gear system and output system is established through the counter shaft.

The multi-mode electro-mechanical variable speed transmission may further include a one-way clutch that engages in one direction and disengages in the opposite direction to allow one connected member to transfer torque to another connected member in one-direction only. In general, clutch and one-way clutch are referred to as torque transfer devices. Through coordinated operation of the torque transfer devices and control of electric machines, the transmission can be operated in multiple operating modes, including a first electric drive mode where one of the electric machines provide motive power, a second electric drive mode where two electric machines work together to provide improved motive power, a first hybrid drive mode where the engine is on and transmission is operated with continuously variable speed ratio with low output-to-input speed ratios, a second hybrid drive mode where the engine is on and the transmission is operated with continuously variable speed ratio with high output to input speed ratios, and at least a fixed speed ratio drive mode where the output-to-input speed ratio of the transmission is a constant. The fixed speed ratio operation may be desirable for special applications.

The multi-mode electro-mechanical variable speed transmission can be operated under pure electric drive modes with engine being turned off to meet all electric drive range requirements. When operating under electric only modes, the clutch selectively connects the second electric machine to the third knot of the first lever and disconnects the second electric machine from the fourth knot of the second lever. The second electric machine provides drive torque and motive power to output system to propel the vehicle. The first electric machine provides torque to balance resistant torque from the engine and to keep the engine at zero speed or a predetermined speed. When equipped with the optional one-way clutch at the third knot of the second lever or at the input shaft, the transmission can utilize both the first and second electric machines to provide drive torque and motive power to the output system to propel the vehicle for improved acceleration and enhanced power performance. The one-way clutch prevents the engine from rotating in reverse direction and provides a reaction torque to balance the drive torque of the first electric machine. This allows for the first electric machine to provide drive torque and motive power in tandem with the second electric machine to propel the vehicle. This operation mode may be required for plug-in hybrid vehicles with demanding all electric drive range specifications.

During operation, the multi-mode electro-mechanical variable speed transmission is capable of switching between various operating modes. When switching between the two hybrid operation modes, the second electric machine selectively couples to the first or the second levers via the clutch to realize two different power split configurations. The switching is synchronized, that is to say at the moment of switching the third knot of the first lever has essentially the same rotation speed as that of the fourth knot of the second lever. Both match the speed of the second electric machine. To ensure speed synchronization between the third knot of the first lever and the fourth knot of the second knot, the gear ratio of the first lever $K_s$ and the gear ratios of the second lever $K_a$ and $K_b$ must satisfy a predetermined proportional relationship. This relationship is set forth $$K_s = \frac{K_a + 1}{K_b - K_a} \tag{1}$$

At the switching point between the different power split modes, the torque of the second electric machine is essentially zero. No torque impact exerts on the clutch. This leads to a smooth, continuous and non-interruptive operation in terms of speed, torque and power for components associated with the input shaft, the output system, and the first and second electric machines.

The current invention also provides a method for design, producing and operating the multi-mode electro-mechanical variable speed transmission. The method includes following steps:
  (1) Produce a first planetary gear set; the planetary gear system includes at least three co-axial rotatable components each corresponding to a knot on a three-knot lever diagram; the inter-distance between the first and the second knots is one unit in length and inter-distance between the second and the third knots is $K_s$ unit in length. Produce a second planetary gear set; the second planetary gear system includes at least four co-axial rotatable components each corresponding to a knot on a four-knot lever diagram; the inter-distance between the first and third knots is denoted by $K_b$, the inter-distance between the second and third knots is $K_a$, the inter-distance between the third and the fourth knots is one unit. The two planetary gear sets are designed such that the following relationship is closely met $$K_s = \frac{K_a + 1}{K_b - K_a}$$

(2) Produce a first and a second electric machine; the maximum continuous power ratings of the electric machines are set to be no less than $P_{EM}$.
(3) Design and produce an input shaft capable of transmitting a maximum power no less than $P_{in}$.
(4) Design and produce an output system; the output system further include at least one drive shaft
(5) Design and produce at least one torque transfer device having at least one engagement position.
(6) Connect the first co-axial rotatable component of the first planetary gear set to a stationary member of the transmission; connect the second co-axial rotatable component of the first planetary gear set to the second co-axial rotatable component of the second planetary gear set;
(7) Connect the first electric machine to the first co-axial rotatable component of the second planetary gear set; connect output system to the second co-axial rotatable component of the second planetary gear set; connect the input shaft to the third co-axial rotatable component of the second planetary gear set, and connect the second electric machine selectively to the third co-axial rotate component of the first planetary gear set or to the fourth co-axial rotatable component of the second planetary gear set.
(8) Operate the transmission in at least two hybrid drive modes; switch between the operating modes through the at least one torque transfer device by selectively connecting the second electric machine to the first planetary gear set and disconnecting it from the second planetary gear set or connecting the second electric machine to the second planetary gear set and disconnecting it from the first planetary gear set; at the switching point, the component to of the respect planetary gear set be connected by the torque transfer device to the second electric machine is automatically synchronized in speed with the second electric machine; at switching point, the speed ratio between the second branch and the third branch of the second planetary gear system is denoted by $SR_b$.
(8) Select the characteristic parameter $K_s$ of the first planetary gear set and characteristic parameters $K_a$ and $K_b$ of the second planetary gear system such that the following relationship holds true, $$\frac{(K_a + 1)(1 - SR_b)}{K_a \cdot SR_b} = K_s \quad (2)$$

$$\frac{K_b(K_a + 1)}{K_b - K_a} \leq \left(\frac{1 + \frac{P_{em}}{P_{in}}}{1 - \frac{P_{em}}{P_{in}}}\right)^2 \quad (3)$$

The above-mentioned technical solution has following benefits: it offers a novel multi-mode electro-mechanical variable speed transmission with reduced power demands on electric machines, the transmission has simple and compact mechanical structure and low manufacturing cost, it is capable of providing continuous variable speed operation from reverse to stop and to forward, without requiring the conventional launching device, and the transmission significantly improves the overall efficiency of the vehicle.

BRIEF DESCRIPTION OF THE DRAWINGS

In the accompany drawings which form part of the specification.

DETAILED DESCRIPTION OF THE PREFERRED EMBODIMENTS

The current invention can have various embodiments, variants, and configurations that incorporate the spirit of current invention. Embodiments and configurations disclosed hereafter in text and in illustrations are used for the purpose of explanation only and shall not be interpreted as limitation to the scope of current invention. The following detailed description illustrates the invention by way of example and not by way of limitation.

Figure 1:
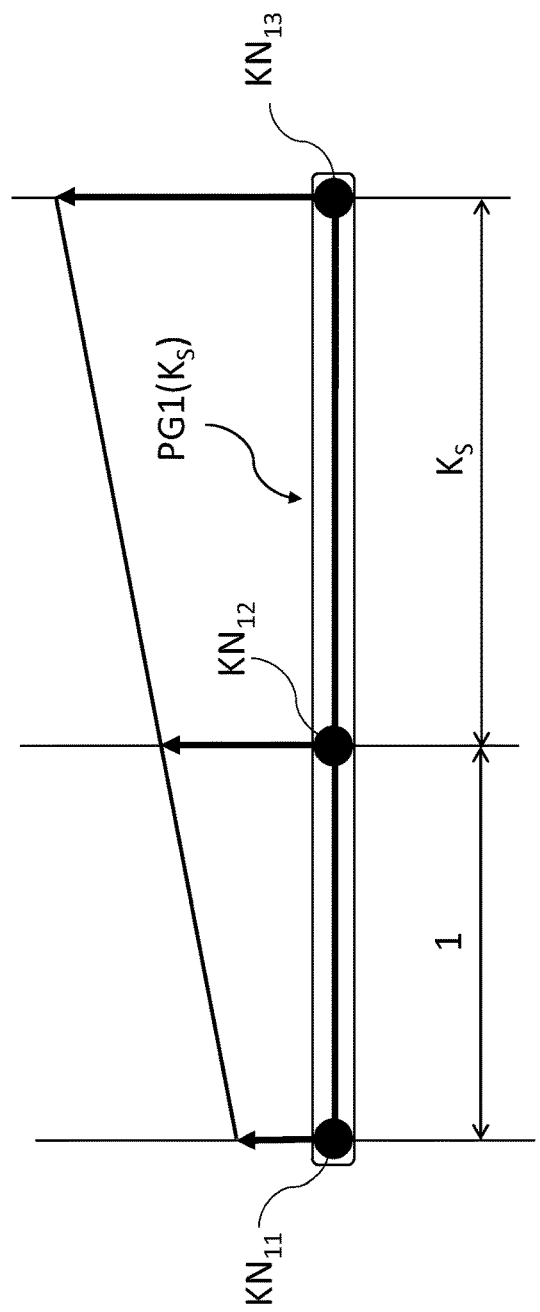
FIG. 1 is a three-knot lever diagram that represents a three-branch planetary gear set, describing the rotational speed relationship among the three co-axial rotating components of the gear set.

FIG. 1 shows a three-knot lever diagram, representing a three-branch planetary gear set. The three-branch planetary gear set has three co-axial rotatable components, the ring gear, the planet carrier and the sun gear. They are represented respectively by the three knots of the three-knot lever. From left to right (or from right to left), these three knots are referred to as the first knot, the second knot and the third knot, respectively. The inter-distance between the first and second knots in the lever diagram is one unit in length; the inter-distance of the second knot and the third knot is $K_s$ unit in length wherein $K_s$ is the gear teeth ratio of the ring gear to the sun gear. The gear ratio $K_s$ is the characteristic parameter that fully defines the three-knot lever. The three-branch planetary gear set is denoted by PG1, or by PG1($K_s$) to signify that the planetary gear set is characterized by the characteristic parameters $K_s$.

Figure 2:
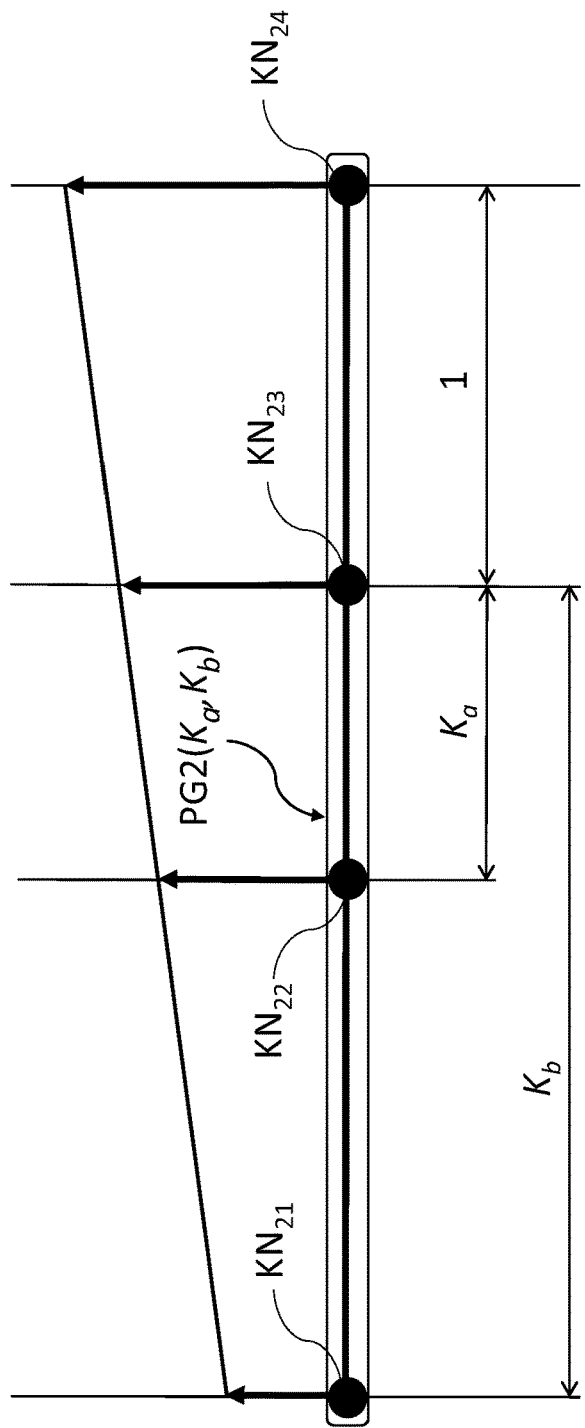
FIG. 2 is a four-knot lever diagram that represents a four-branch planetary gear set, describing the rotational speed relationship among the four co-axial rotating components of the gear set.

FIG. 2 shows a four-knot lever diagram, representing a four-branch planetary gear set. The four-branch gear set has four co-axial rotatable components each represented by a knot on the four-knot lever diagram. For left to right (or from right to left), these four knots are referred to as the first knot, the second knot, the third knot and the fourth knot, respectively. The inter-distance between the first and third knots is $K_b$ unit in length; the inter-distance between the second and third knots is $K_a$ unit in length and the inter-distance between the third and fourth knots is one unit in length wherein $K_a$ and $K_b$ are characteristic gear teeth ratios of the four-branch planetary gear set. $K_a$ and $K_b$ are characteristic parameters that fully define the four-knot lever. That is to say, the performance characteristics of the four-branch planetary gear set are uniquely defined by the characteristic parameters $K_a$ and $K_b$. The relationships between the parameters $K_a$, $K_b$ and the teeth numbers of the associated gears of the corresponding planetary gear set are determined by the actual structure of the planetary gear set, as described in more detail below. The four-branch planetary gear set is denoted by PG2, or by PG2($K_a$, $K_b$) to indicate that the planetary gear set is characterized by the parameters $K_a$ and $K_b$.

It should be understood that a lever diagram is a schematic representation of a planetary gear set wherein the co-axial rotatable components of planetary gear set are each represented by a knot on the lever diagram. The lever diagram can be used to graphically describe rotation speeds among the co-axial rotatable components. Those having ordinary skill in the art will recognize that when referring to a knot on a lever diagram, it is equivalent to referring to the corresponding co-axial rotatable component of the planetary gear set which the lever diagram is representing and vice versa. Those having ordinary skill in the art will understand that the terms such as "couple", "connect" and "engage" are used to represent fixed mechanical connections or rotatable meshing engagements (through a pair of gears for example) between two or more mechanical components to transmit torque and mechanical power. These terms are also used to represent electric connections between two or more electric components to transmit electric power. In the Figures, mechanical couplings or connections between various members or components are illustrated by solid lines.

Figure 3:
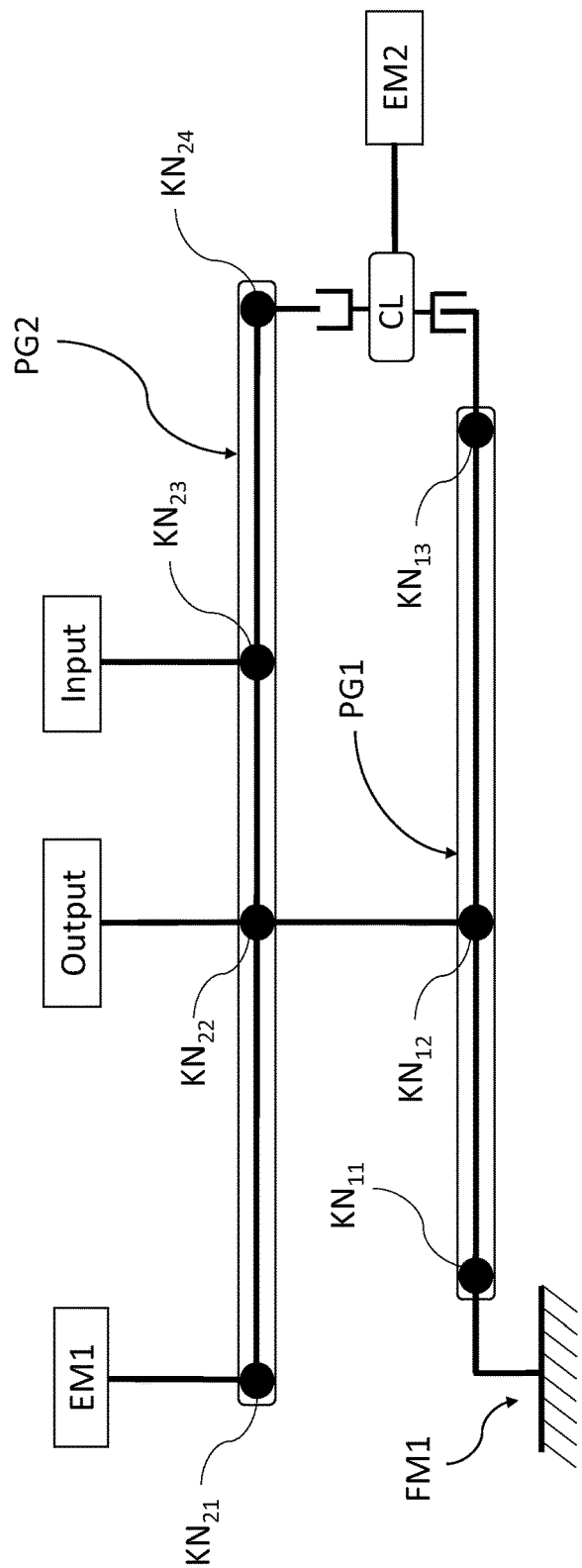
FIG. 3 is a schematic lever diagram of a preferred embodiment (embodiment 1) of a multi-mode electro-mechanical variable speed transmission of the current invention.
Figure 4:
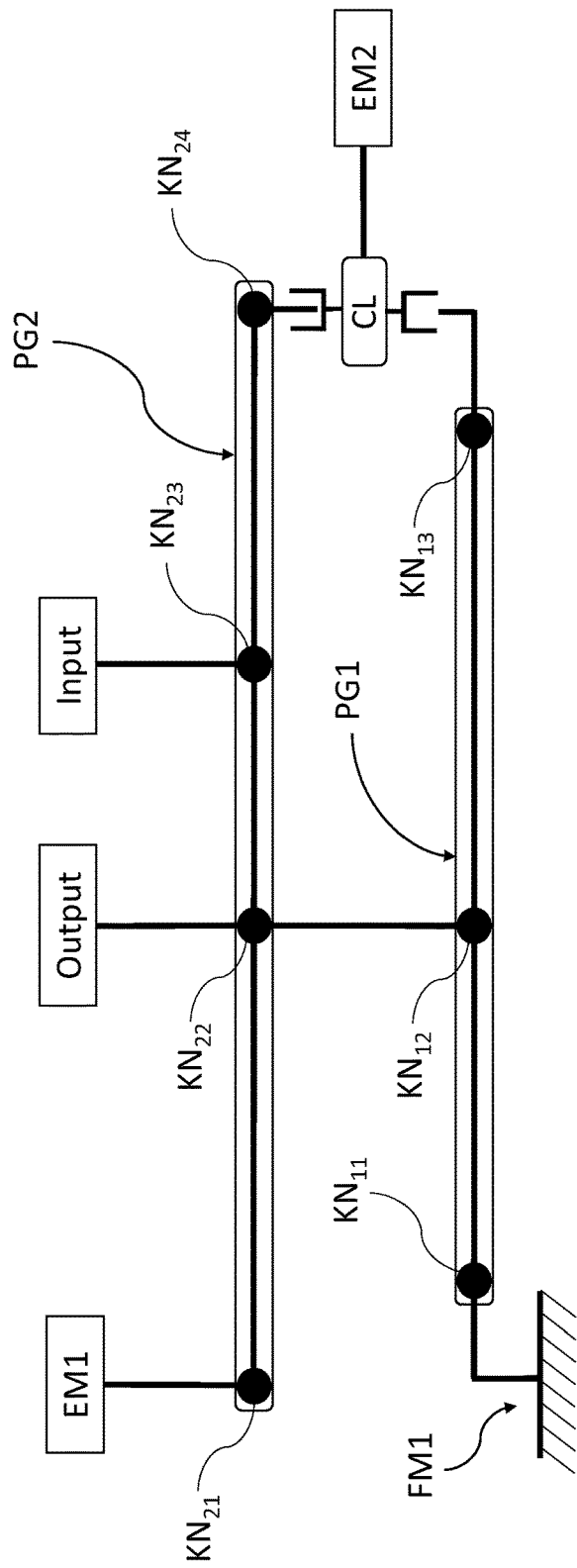
FIG. 4 is a schematic lever diagram of the preferred embodiment (embodiment 1) of FIG. 3 in a different operating position.

FIG. 3 and FIG. 4 show embodiment 1 of the current invention. The embodiment is illustrated in the lever diagram format. The multi-mode electro-mechanical variable speed transmission is comprised of a gear system including a first planetary gear set (PG1) represented by a first lever and a second planetary gear set (PG2) represented by a second lever, an input shaft (Input), an output system (Output), a clutch (CL), a first stationary member (FM1), and first and second electric machines (EM1, EM2) along with their associated drives and controllers (not shown). The first planetary gear set is a three-branch planetary gear, having a first co-axial rotatable component, a second co-axial rotatable component and a third co-axial rotatable component each represented by a first knot ($KN_{11}$), a second knot ($KN_{12}$) and a third knot ($KN_{13}$) of the first lever, respectively. The second planetary gear set is a four-branch planetary gear set, having first, second, third and fourth co-axial rotatable components represented by first, second, third and fourth knots ($KN_{21}$, $KN_{22}$, $KN_{23}$, $KN_{24}$) of the second lever, respectively. The first knot ($KN_{11}$) of the first lever (PG1) connects to the stationary member (FM1). The second knot ($KN_{12}$) of the first lever (PG1) connects to the second knot ($KN_{22}$) of the second lever (PG2) such that the second knot ($KN_{12}$) of the first lever (PG1) rotates at the same rational speed as the second knot ($KN_{22}$) of the second lever (PG2).

The first electric machine (EM1) includes a first rotor and a first stator. Referring to FIG. 3, the rotor of the first electric machine (EM1) directly couples to the first knot ($KN_{21}$) of the second planetary gear set (PG2). The output shaft (Output) couples to the second knot ($KN_{12}$) of the first planetary set (PG1) and to the second knot ($KN_{22}$) of the second planetary gear set (PG2). The input shaft (Input) couples to the third knot ($KN_{23}$) of the second planetary gear set (PG2).

The second electric machine (EM2) includes a second rotor and a second stator. The rotor of the second electric machine (EM2) couples selectively through the clutch (CL) to the third knot ($KN_{13}$) of the first planetary gear set (PG1) or to the fourth knot ($KN_{24}$) of the second planetary gear set (PG2), or to both the third knot ($KN_{13}$) of the first planetary gear set and the fourth knot ($KN_{24}$) of the second planetary gear set. Thus the second electric machine (EM2) selectively couples directly to the fourth knot ($KN_{24}$) of the second planetary gear set (PG2) with a first constant speed ratio, or indirectly through the first planetary gear set (PG1) to the second knot ($KN_{22}$) of the second planetary gear set (PG2) with a second constant speed ratio.

The first and second electric machines (EM1, EM2), along with their respective drives, are electrically connected to transmit power to and from each other. The multi-mode electro-mechanical variable speed transmission may further include an energy storage device such as a battery pack (BT, not shown in illustrations) to store and recapture energy. The energy storage device is connected to the first and second electric machines to receive power from or deliver power to one or both of the electric machines.

When the second electric machine (EM2) couples to the first planetary gear set (PG1), the clutch (CL) connects the second electric machine EM2 to the third knot ($KN_{13}$) of the first planetary gear set and disconnect the second electric machine (EM2) from the fourth knot ($KN_{24}$) of the second planetary gear set (PG2) as shown in FIG. 3. The transmission is operated under the first power split mode. The input power from the engine is split into two power paths to transmit to the output system. One is the pure mechanical power path that goes from the input shaft (Input), through the second knots ($KN_{12}$, $KN_{22}$) of the first and second planetary gear sets (PG1, PG2), to the output system (Output). The other is the electro-mechanical power path that goes from input shaft (Input), through the second planetary gear set (PG2), the first electric machine (EM1), the second electric machine (EM2), the clutch (CL) and the first planetary gear set (PG1), to the output system (Output).

When the second electric machine (EM2) couples to the second planetary gear set (PG2), the clutch (CL) disconnects the second electric machine (EM2) from the third knot ($KN_{13}$) of the first planetary gear set (PG1) and connects it to the fourth knot ($KN_{24}$) of the second planetary gear set (PG2) as shown in FIG. 4. The transmission is operated under the second power split mode. Similarly, the input power from the engine is split into two power paths to transmit to the output system (Output). The pure mechanical power path goes from the input shaft (Input) through the second planetary gear set (PG2) to the output system (Output); the electro-mechanical power path goes from the input shaft (Input), through the second planetary gear set (PG2), the first electric machine (ME1), the second electric machine (EM2), and the clutch (CL) back to the second planetary gear set (PG2), and finally to the output system (Output).

To facilitate the following description, the ratio of the output system (Output) speed to the input shaft (Input) speed is defined as the output-to-input speed ratio of the transmission and is simply referred to hereafter as the speed ratio denoted by SR.

The first embodiment (embodiment 1) is capable of providing a natural speed ratio node SR0, where the speed of the output shaft system is zero, and two regular speed ratio nodes SR1 and SR2. At the regular speed ratio nodes SR1 and SR2, at least one of the electric machines achieves zero rotational speed. The natural speed ratio node SR0 divides the entire speed ratio regime into a forward speed ratio regime and a reverse speed ratio regime. Above the natural speed ratio node is the forward regime; below the natural speed ratio node is the reverse regime. The first regular speed ratio node SR1, also simply referred to as the first speed ratio node, further divides the forward regime into a low-speed ratio regime and a high-speed ratio regime. Below the first regular speed ratio node SR1 is the low speed ratio regime and above the first regular speed ratio node SR1 is the high speed ratio regime.

At the first speed ratio node point SR1, the torque of the second electric machine (EM2) is zero if there is no net power exchange between the transmission and the energy storage device. Thus, it would be advantageous to choose SR1 as the switching point between different power split modes to avoid or minimize possible shock load in torque for the transmission. In the low speed ratio regime below SR1, the transmission adopts the so-called output power split configuration. In the high speed ratio regime above SR1, the transmission adopts the so-call compound power split configuration. In the reverse regime, the hybrid system operates under pure electric drive mode. Thus, the power in each power path, whether the mechanical power path or the electro-mechanical power path, is always less than the power transmitted through the transmission from the input shaft to the output system. No internal power circulation exists in any speed ratio regime for the multi-mode electro-mechanical variable speed transmission. The speed ratio range of the transmission is thus effectively extended. To ensure speed synchronization of the clutch (CL) at the mode switching point SR1, one of the following relationships between the gear ratios has to be satisfied as closely as possible, $$K_s = \frac{K_a + 1}{K_b - K_a} \qquad (4a)$$

$$K_s = K_b \qquad (4b)$$

Taking into consideration of possible internal power losses of the electric machines and the associated drives, and the consideration constraint imposed by gear teeth numbers, the actual switching point $SR_b$ in speed ratio may be at the vicinity of SR1. The output power split operating mode is adopted at the low speed ratio regime below SR1, the compound power split operating mode is adopted at the mid to high speed ratio regime above SR1. In reverse regime pure electric drive mode could be adopted to effectively avoid internal power circulation. To ensure clutch rotational speed synchronization at switching speed ratio $SR_b$, the gear ratios have to satisfy following relationship:

$$SR_b = \frac{K_a + 1}{K_a(K_s + 1) + 1} \qquad (5)$$

Figure 5:
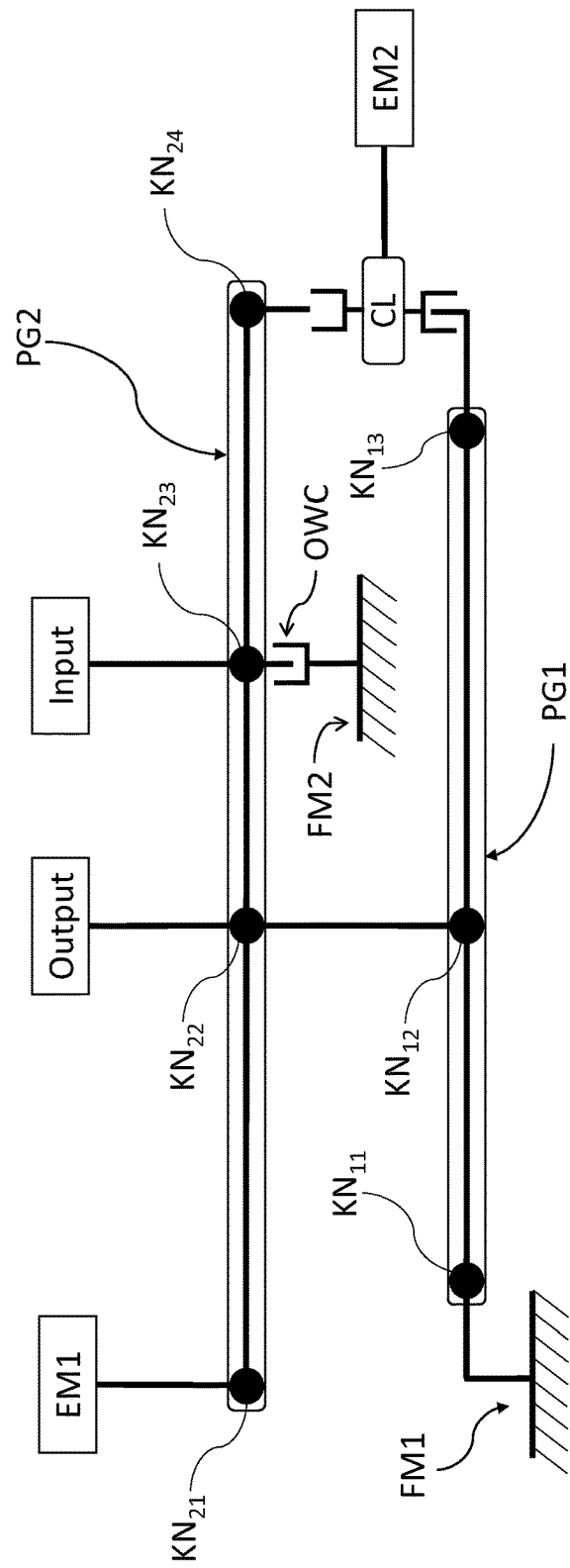
FIG. 5 is a schematic lever diagram of a variant of the preferred embodiment (embodiment 1) of multi-mode electro-mechanical variable speed transmission of the current invention with an optional torque transfer device at the third knot of the second lever.

FIG. 5 shows embodiment 1A, which is a variant of the first embodiment. In FIG. 5, the multi-mode electro-mechanical variable speed transmission further includes a second stationary member (FM2) and a second torque transfer device. The second torque transfer device in a simple form is a one-way clutch (OWC). The one-way clutch (OWC) selectively connects the second stationary member (FM2) to the third knot ($KN_{23}$) of the second planetary gear set (PG2). The one-way clutch prevents the input shaft (Input) from rotating in the reverse direction and provides reaction torque to balance the drive torque of the first electric machine (EM1) when it acts as motor during one of the pure electric drive mode.

Figure 6:
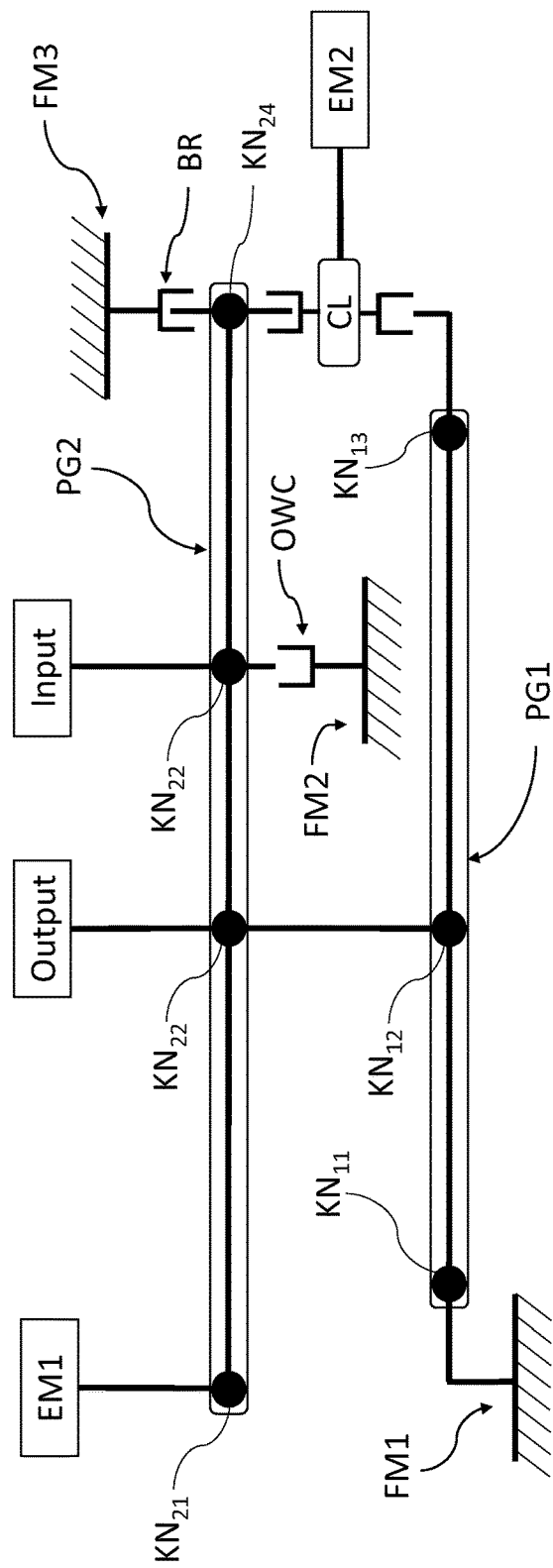
FIG. 6 is a schematic diagram of anther variant of the preferred embodiment (embodiment 1) of multi-mode electro-mechanical variable speed transmission of the current invention.

FIG. 6 shows embodiment 1B, which is another variant of the preferred embodiment. In FIG. 6, the multi-mode electro-mechanical variable speed transmission further includes a third stationary member (FM3) and a third torque transfer device. The third torque transfer device is a brake (BR). The brake selectively connects or disconnects the fourth knot ($KN_{24}$) of the second planetary gear set (PG2) to or from the third stationary member (FM3).

Figure 7:
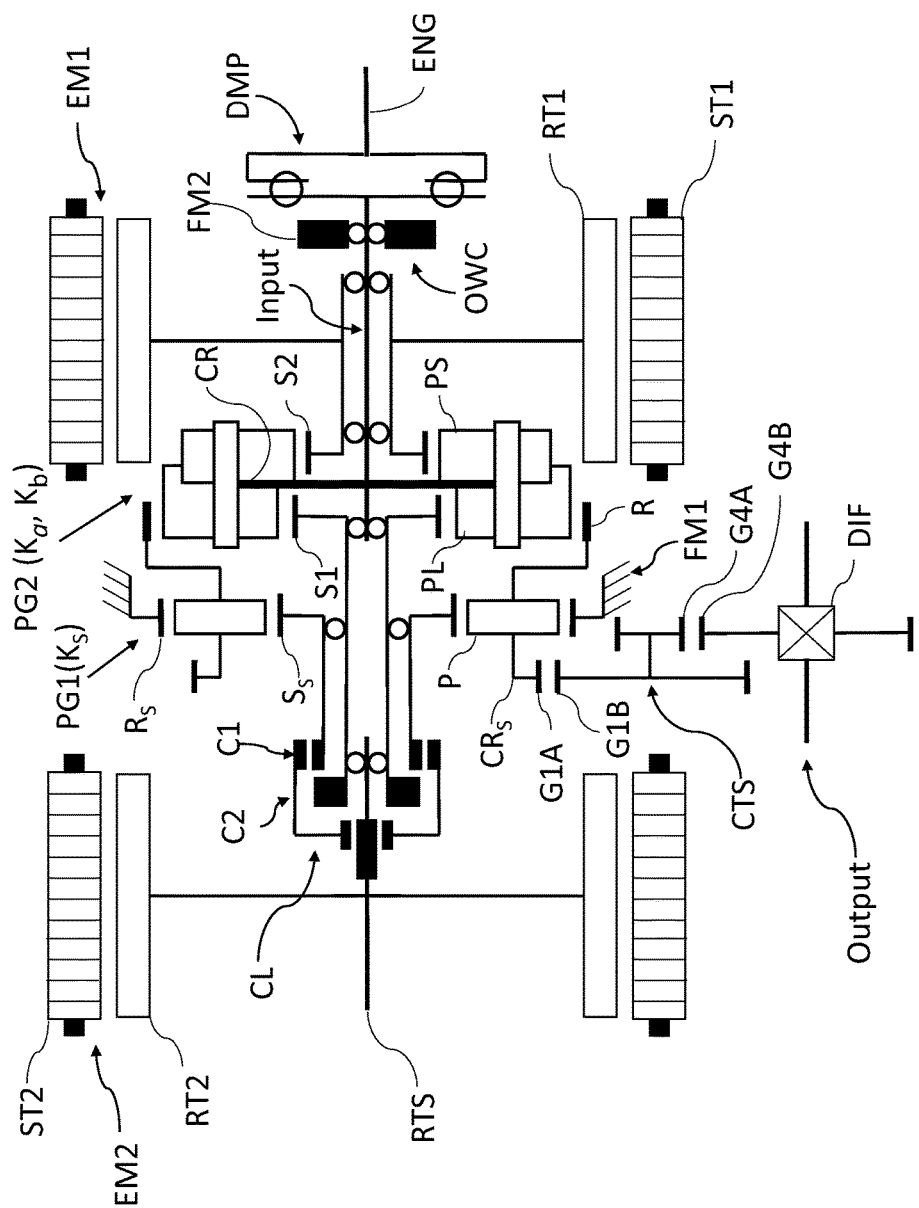
FIG. 7 is a component schematic diagram of the referred embodiment (embodiment 1) of multi-mode electro-mechanical variable speed transmission of the current invention.

FIG. 7 shows the same embodiment as FIG. 5 in component format wherein the knots of the lever diagrams are each represented in an actual component of the corresponding planetary gear sets. The multi-mode electro-mechanical variable speed transmission is comprised of a first planetary gear set (PG1) including three co-axial rotatable components, a second planetary gear set (PG2) including four co-axial rotatable components, an input shaft (Input), an output system (Output), a first torque transfer device or a clutch (CL), a second torque transfer device (OWL), a first stationary member (FM1), a first electric machine (EM1) and a second electric machine (EM2). The transmission may also include a torsional damper (DMP) to connect the input shaft (Input) to the engine output shaft (ENG) and a counter shaft system (CTS) to connect the first and second planetary gear sets to the output system (Output).

The first planetary gear set (PG1) includes a sun gear ($S_s$), a ring gear ($R_s$), a set of planet gears (P) supported on a planet carrier ($CR_s$). The planet gears (P) are arranged around and in external mesh with the sun gear ($S_s$). The planet gear (P) are in internal mesh with the ring gear ($R_s$). The sun gear ($S_s$), the planet carrier ($CR_s$) and the ring gear ($R_s$) are the three co-axial rotatable components of the first planetary gear set (PG1). These three co-axial rotatable components are represented respectively as the first knot ($KN_{11}$), the second knot ($KN_{12}$) and the third knot ($KN_{13}$) on a three-knot lever diagram. The first planetary gear set (PG1) is characterized the gear teeth ratio $K_s$ of ring gear ($R_s$) to the sun gear ($S_s$) which is expressed as the inter-distance between the second and third knots on the three-knot lever diagram.

$$K_s = \frac{Z_{S_s}}{Z_{R_s}} \quad (6)$$

where $Z_{S_s}$ and $Z_{R_s}$ are the number of teeth for sun gear ($S_s$) and ring gear ($R_s$) of the first planetary gear set (PG1), respectively.

The second planetary gear set (PG2) is a Ravigneaux planetary gear-train. It includes a first sun gear (S1), a second sun gear (S2), a ring gear (R), a first set of planet gears (PS), a second set of planet gears (PL), and a planet carrier (CR) that hosts and supports the first and second sets of planet gears (PS, PL). The planet gears in the first set of planet gears (PS) are short planet gears and the planet gears in the second set of planet gears (PL) are long planet gears. Each of the long planet gears (PL) is in internal meshing engagement with the ring gear (R) and in external meshing engagement with the first sun gear (S1); each of the short planet gears (PS) is in external meshing engagement with a corresponding long planet gear (PL) and with the second sun gear (S2). The second sun gear (S2), the ring gear (R), the planet carrier (CR) and the first sun gear (S1) are the four co-axial rotatable components of the second planetary gear set (PG2) and as represented as the first knot ($KN_{21}$), the second knot ($KN_{22}$), the third knot ($KN_{23}$) and the fourth knot ($KN_{24}$) on a four-knot lever diagram. The second planetary gear set is characterized by two gear teeth ratios $K_a$ and $K_b$.

$$K_a = \frac{Z_{S1}}{Z_R}; K_b = \frac{Z_{S1}}{Z_{S2}} \quad (7)$$

where $Z_{S1}$, $Z_{S2}$ and $Z_R$ are the tooth numbers of the first sun gear (S1), the second sun gear (S2) and the ring gear (R) of the second planetary gear set (PG2), respectively. On the four-knot lever diagram, $K_a$ and $K_b$ are denoted as the inter-distance between the second and third knots and the inter-distance between the first and third knots, respectively.

The first planetary gear set (PG1) and the second planetary gear set (PG2) are co-axially arranged and adjacent to each other in the axial direction. The ring gear ($R_s$) of the first planetary gear set (PG1) is connected to the first stationary member (FM1). This regard, the first planetary gear functions merely as a stepping up gear with a constant gear ratio. The planet carrier ($CR_s$) of the first planetary gear set is fixed with the ring gear (R) of the second planetary gear set (PG2) such that they have a same rotational speed.

The output system includes drive shaft and an optional differential (DIF). The first torque transfer device (CL) has at least two engagement states. It could be an integrated unit of a first and a second clutches (C1, C2) each having an engagement and a disengagement states. The first electric machine EM1 includes a first rotor (RT1) and a first stator (ST1). The second electric machine (EM2) includes a second rotor (RT2) and a second stator (ST2). The second torque transfer device includes a second stationary member (FM2) and a one-way clutch (OWC). The counter shaft system (CTS) includes a first pair of meshing gears (G1A, G1B) and a second pair of meshing gears (G4A, G4B).

The multi-mode electro-mechanical variable speed transmission is configured to provide multiple modes of operations through the unique connections between the gear system (PG1, PG2) and the motive components (Input, Output, EM1 and EM2). Referring to FIG. 7, the rotor (RT1) of the first electric machine (EM1) is connected to the second sun gear (S2) of the second planetary gear set (PG2). The output system (Output) is connected through the two pairs of meshing gears (G4B, G4A and G1B, G1A) of the counter shaft system (CTS) to the planet carrier ($CR_s$) of the first planetary gear set (PG1) and the ring gear (R) of the second planetary gear set (PG2) wherein the differential (DIF) connects to the driven gear (G4B) of the second pair of meshing gears of the counter shaft system (CTS) and drive gear (G1A) of the first pair of meshing gears of the counter shaft system (CTS) connects to the planet carrier ($CR_s$) of the first planetary gear set (PG1) and the ring gear (R) of the second planetary gear set (PG2). The engine (ENG) drives the input shaft (Input) through the torsional damper (DMP). The input shaft (Input) in turn connects to the planet carrier (CR) of the second planetary gear set. The input shaft (Input) also couples to the second torque device wherein the one-way clutch (OWC) directionally engages the second stationary member (FM2) to prevent the input shaft from rotating in the opposite direction as the engine. The rotor (RT2) of the second electric machine (EM2) is selectively coupled through the first torque transfer device (CL) either to the sun gear ($S_s$) of the first planetary gear set (PG1) wherein the first clutch (C1) engages and the second clutch (C2) disengages, or to the first sun gear (S1) of the second planetary gear set (PG2) wherein the first clutch (C1) disengages and the second clutch (C2) engages. Thus the second electric machine (EM2) couples selectively to the first sun gear (S1) of the second planetary gear set (PG2) with a first constant speed ratio (a speed ratio of 1:1) or through the first planetary gear set (PG1) to the ring gear (R) of the second planetary gear set (PG2) with a second speed ratio (a speed ratio of [Ks+1]:1).

The first and second torque transfer devices (CL, OWC) are arranged on the same rotational axis as the first and second planetary gear sets. That is to say, the first planetary gear set (PG1), the second planetary gear set (PG2), the first torque transfer device (CL) and the second torque transfer device (OWC) are all on the same rotational axis. In addition, the first torque transfer device (CL) and the first and second planetary gear sets (PG1, PG2) are co-axially arranged with and sandwiched between the two electric machines (EM1, EM2). This has a great advantage in reducing package size.

The first torque transfer device (CL) may further be integrated with the brake (BR) and the third stationary member (FM3). It may be modified to include four engagement positions as shown in FIGS. 8 to 11. The integrated torque transfer device (CL) is comprised of a first clutch having a first clutch member (C1), a second clutch having a second clutch member (C2), a third clutch having a third clutch member (BR), and a sleeve ring (SL). The first clutch member (C1) is fixed with the sun gear ($S_s$) of the first planetary gear set (PG1), the second clutch member (C2) the fixed with the first sun gear (S1) of the second planetary gear set, and the third clutch member (BR) is fixed with the third stationary member (FM3). The sleeve ring (SL) is connected to a rotor shaft (RTS) of the second electric machine (EM2) through a pair of mating splines ($SP_i$, $SP_o$). The male spline ($SP_o$) of the mating pair is fixed to the rotor shaft (RTS) and the female spline ($SP_i$) is fixed to the sleeve ring (SL). The female spline (SP$_i$) slides back-and-forth over the male spline (SP$_o$) along the axial direction by an actuator (not shown) under commend.

Figure 8:
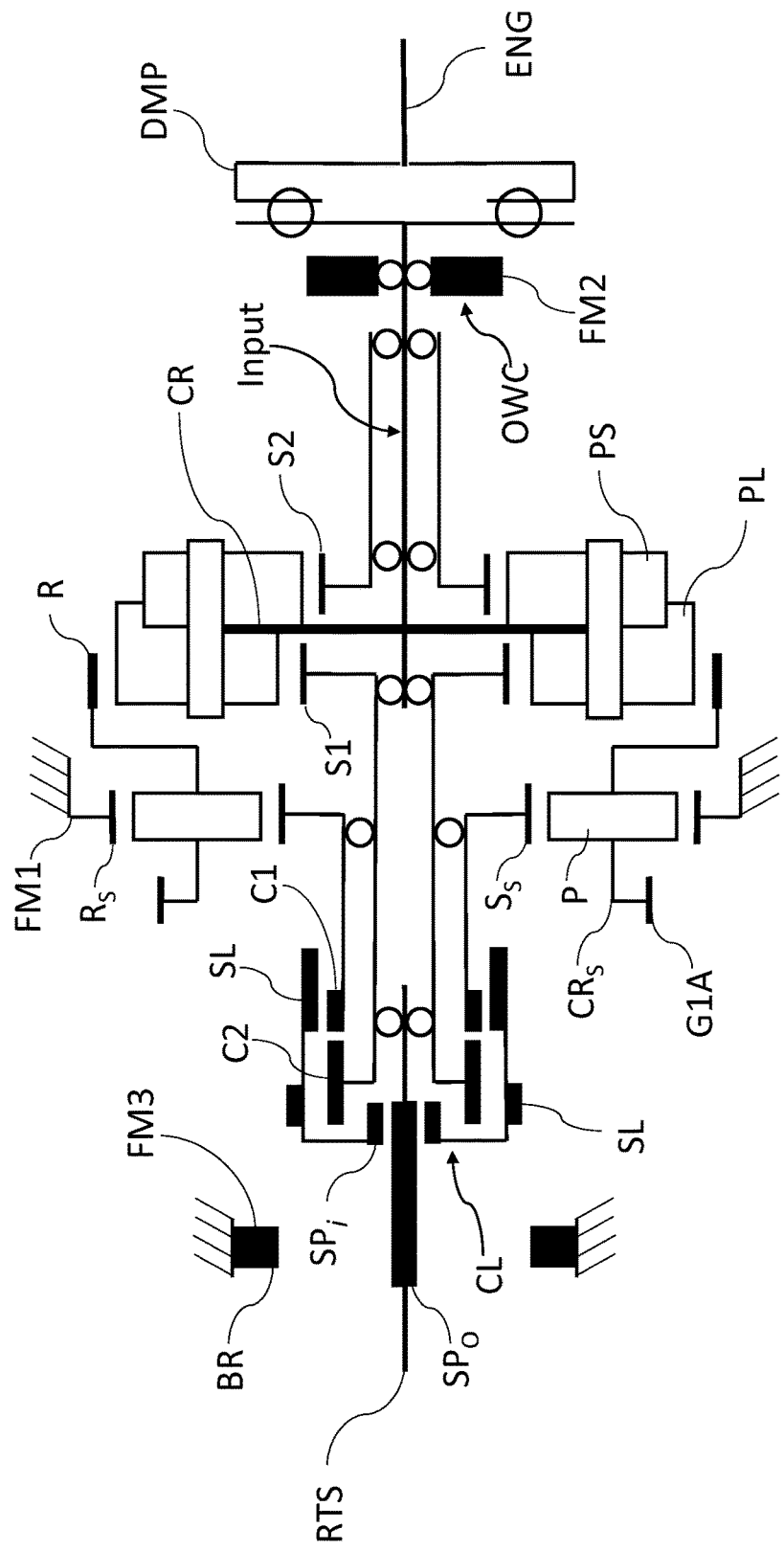
FIG. 8 is a component schematic diagram of the transmission of FIG. 7, showing the torque transfer device in the first engagement position.

FIG. 8 shows the first engagement position of the first torque transfer device, wherein the sleeve ring (SL) is engaged only with the first clutch member (C1). In this case, the rotor shaft (RTS) and thus the rotor (RT2) of the second electric machine (EM2) is coupled to the sun gear (S$_s$) of the first planetary gear set (PG1). The transmission operates in a first power-split mode.

Figure 9:
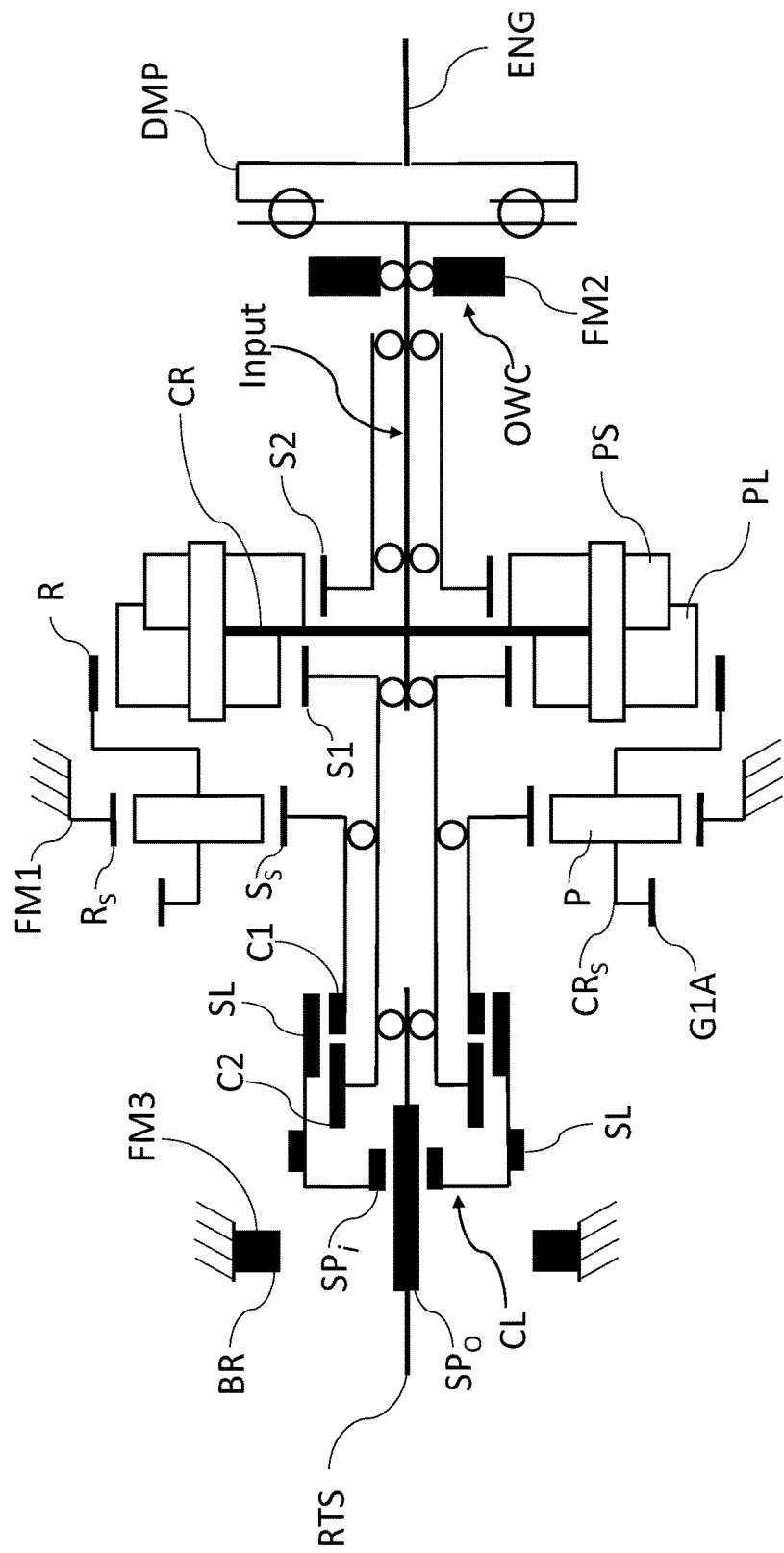
FIG. 9 is a component schematic diagram of the transmission of FIG. 7, showing the torque transfer device in the second engagement position.

FIG. 9 shows the second engagement position of the first torque transfer device, wherein the sleeve ring (SL) is engaged with both the first and second clutch members (C1, C2). In this case, the rotor shaft (RTS) and thus the rotor (RT2) of the second electric machine (EM2) is coupled to both the sun gear (S$_s$) of the first planetary gear set (PG1) and the first sun gear (S1) of the second planetary gear set (PG2). The transmission operates in a first fixed speed ratio mode.

Figure 10:
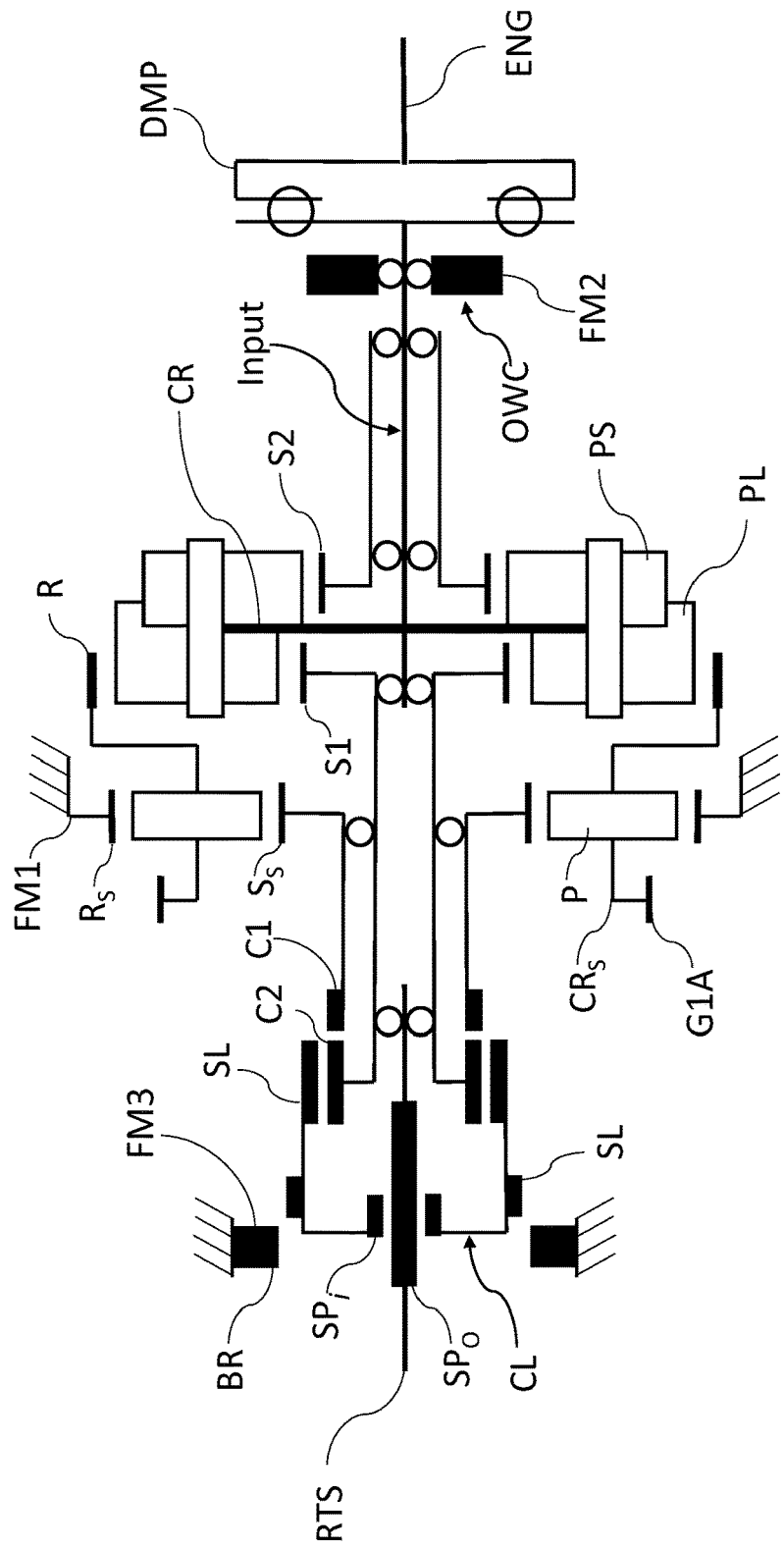
FIG. 10 is a component schematic diagram of the transmission of FIG. 7, showing the torque transfer device in the third engagement position.

FIG. 10 shows the third engagement position of the first torque transfer device, wherein the sleeve ring (SL) is engaged only with the second clutch members (C2). In this case, the rotor shaft (RTS) and thus the rotor (RT2) of the second electric machine (EM2) is coupled to the first sun gear (S1) of the second planetary gear set (PG2). The transmission operates in a second power-split mode.

Figure 11:
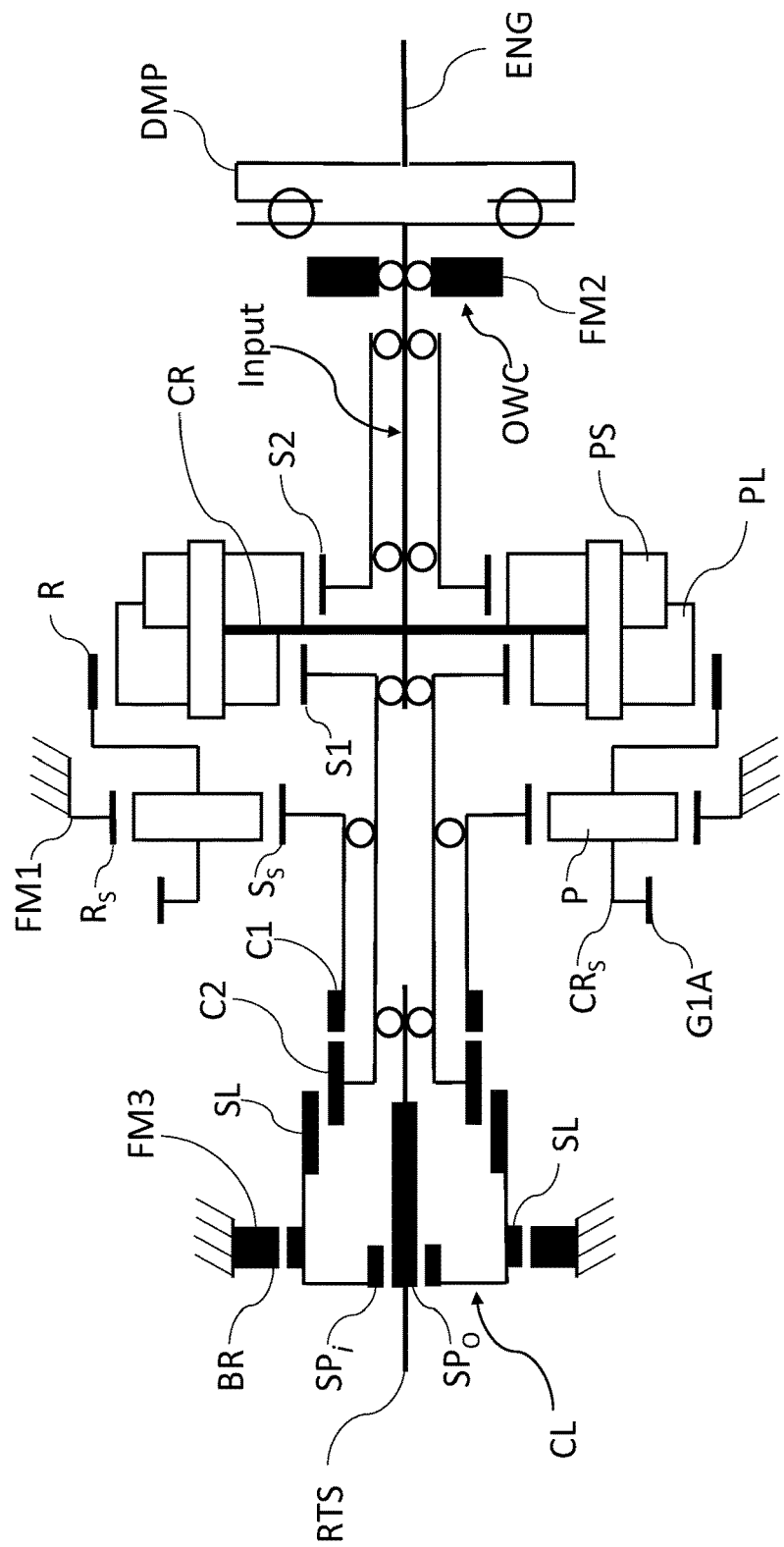
FIG. 11 is a component schematic diagram of the transmission of FIG. 7, showing the torque transfer device in the fourth engagement position.

FIG. 11 shows the fourth engagement position of the first torque transfer device, wherein the sleeve ring (SL) engages with both the second and third clutch members (C2, BR). In this case, the rotor shaft (RTS) and thus the rotor (RT2) of the second electric machine (EM2) is coupled to both the first sun gear (S$_s$) of the second planetary gear set (PG2) and the third stationary member (FM3). The transmission operates in a second fixed speed ratio mode.

The four engagement positions of the first torque transfer device are arranged adjacent to each other along the axial direction. When positive engagement clutches such as dog-clutches are used, this leads to very compact configuration.

The operation of the multi-mode electro-mechanic variable speed transmission is described below.

Continuously Variable Speed Operation

1. Low Speed Ratio Regime

Before the vehicle starts to move, transmission is set to operate in low speed ratio regime. The second electric machine (EM2) couples through the clutch (CL) to the first planetary gear set (PG1) to gain a leverage to propel the output system (Output). The first electric machine (EM1) is idling, and rotating in the opposite direction to that of the internal combustion engine (Input). The second electric machine (EM2) for a brief moment is at zero speed. As the vehicle starts, the controller sends commands to drive circuit. The drive circuit, in turn, provides the required electric power to the second electric machine (EM2) to generate drive torque. The drive torque is amplified through the first planetary gear set (PG1) and delivered to the output system (Output). At this moment, except for an insignificant amount of internal power losses, the second electric machine (EM2) does not convert yet any electric power into mechanical power. Because the vehicle is still at standstill, there is no requirement for drive power but drive torque at the drive wheels. The drive torque to start the vehicle comes primarily from the second electric machine (EM2). Concurrently, the internal combustion engine provides zero starting torque for the vehicle, thus there is no power output from the engine. As the torque of electric machine increases, the vehicle takes off from standstill and moves forward. Accordingly, the second electric machine (EM2) starts to rotate, consuming electric power and converting it into the required mechanical drive power. Meanwhile, the engine starts to provide drive torque to the drive wheels as well. The first electric machine (EM1) in turn provides reaction torque to balance the engine torque and the speed of the first electric machine (EM1) gradually reduces to accommodate the increased vehicle speed. In this process, the first electric machine (EM1) acts as a generator converting mechanical power into electric power. The electric power consumed by the second electric machine (EM2) is fully or partially provided by the first electric machine (EM1) through electric drives and controllers (CTRL, not shown). After the vehicle starts to move, the drive torque at the drive wheels is shared between the internal combustion engine and the second electric machine (EM2), causing the torque of the second electric machine (EM2) to reduce.

As the speed of vehicle increases, the rotational speed of the second electric machine (EM2) increases and the torque of the second electric machine (EM2) continues to decrease. In contrast, the speed of the first electric machine (EM1) continues to decrease, until reaching zero. At the moment when the first electric machine (EM1) reaches its zero speed point, the transmission arrives at its first regular speed ratio node SR1 Assuming there is no net electric power exchange between the transmission and the energy storage device, the second electric machine (EM2) also arrives at its zero torque point. That is to say the zero torque point (speed ratio node corresponding to zero torque) of the second electric machine (EM2) coincides with the zero speed point (speed ratio node corresponding to zero speed) of the first electric machine (EM1).

2. High Speed Ratio Regime

The first regular speed ratio node SR1 marks the transition from low speed ratio regime to high speed ratio regime, or vice versa. At the operation mode switching point, the second electric machine (EM2) produces zero torque and the speeds of the second electric machine (EM2), the third knot (KN$_{13}$) of the first planetary gear set (PG1) and fourth knot (KN$_{24}$) of the second planetary gear set (PG2) are synchronized. At this moment, the clutch (CL) disconnects the second electric machine (EM2) from the third knot (KN$_{13}$) of the first planetary set (PG1) and connects the second electric machine (EM2) to the fourth knot (KN$_{24}$) of the second planetary gear set (PG2). The transmission is now operating under compound power split mode.

As the speed of the vehicle further increases, the speed ratio of the transmission increases, exceeding the first regular speed ratio node SR1. The rotational speed of the first electric machine (EM1), rises from zero and continues to increase in the same direction as the input shaft (Input). The speed of the second electric machine (EM2) starts to reduce. Should there be no net electric power exchange between the transmission and energy storage device, the torque of the second electric machine (EM2) will rise from zero and increase in value at the opposite direction. The second electric machine (EM2) now functions as a generator, providing electric power to the first electric machine (EM1) or/and to the energy storage device. The first electric machine (EM1), acts as a motor, converting electric power into mechanical power.

As the vehicle continues to increase in speed, the speed of the second electric machine (EM2) continues to decrease to zero. The transmission reaches its second regular speed ratio node SR2. At this speed ratio node, the power transmitted through the electro-mechanical power path becomes zero; all power is transmitted from input shaft (Input) to the output system (Output) through the pure mechanical power path.

Between the first regular speed ratio node SR1 and the second regular speed ratio node SR2, the power split ratio PR, defined as the power transmitted through the electromechanical power path to the total engine power to be transmitted at the input shaft (Input), possesses a local maximum value. The maximum value is dependent upon the characteristic gear ratios of the four-branch planetary gear set (the second planetary gear set). Assuming the maximum input power of the transmission is $P_{in}$ and the maximum continuous power rating of the electric machine is $P_{em}$, the power ratio of the maximum continuous power rating of the electric machine to the maximum input power of the transmission is denoted as $PR_{max}=P_{em}/P_{in}$. For an adequate matching between the sizes of electric machines and the construction of the transmission, so that the transmission can be operated continuously and appropriately between the first and second regular speed ratio nodes, the characteristic parameters of the four-branch gear system must satisfy following condition, $$\frac{K_b(K_a+1)}{K_b-K_a} \le \left(\frac{1+PR_{max}}{1-PR_{max}}\right)^2 \qquad (8)$$

At or in the vicinity of the second regular speed ratio node SR2, the torque of the first electric machine (EM1) reverses its direction. As the speed ratio of the transmission continues to increase, the speed of the first electric machine (EM1) continues to go up; concurrently, the speed of the second electric machine (EM2) rises from zero and increases in the reversed direction. To avoid excessive internal power circulation when the speed ratio of the transmission exceeds far beyond the second regular speed ratio node SR2, a brake (BR) may be employed in the transmission to brake the fourth knot ($KN_{24}$) of the second planetary gear set (PG2) when it is deemed necessary.

3. Reverse Regime.

The regime below the natural speed ratio node SR0 is referred to as the reverse regime. In this regime, the output power split configuration is also applicable. The clutch (CL) connects the second electric machine (EM2) to the first planetary gear set (PG1) and disconnects the second electric machine (EM2) from the second planetary gear set (PG2). The power is delivered from the second knots ($KN_{12}$, $KN_{22}$) of the first and second planetary gear sets to the output system (Output).

Pure Electric Drive Operation

To restrict the power ratio of the electric power path to the input power, avoiding internal power circulation, a pure electric drive mode may be adopted in the reverse regime. In the pure electric drive mode, the engine is turned off. The second electric machine (EM2) is controlled by the controller (CTRL) to convert electric power from the energy storage (BT) into mechanical power and to provide drive torque to the output system (Output). The drive torque from the second electric machine (EM2) is amplified through the first planetary gear set (PG1) before delivered to the output system (Output).

Pure electric drive operation is also applicable in the forward speed ratio regime. In fact, there are a number of electric modes. The first electric drive mode essentially the same as the pure electric drive mode described above for reverse operation. In this electric drive mode, the first torque transfer device (CL) connects the second electric machine (EM2) to the first planetary gear set (PG1) and disconnects the second electric machine (EM2) from the second planetary gear set (PG2). The motive power is provided by the second electric machine (EM2) through the first planetary gear set (PG1). The first planetary gear set (PG1) provides torque leverage by a factor $K_s+1$.

The second electric drive mode calls for two electric machines working in tandem to provide enhanced motive power for fast acceleration or for steep hill-climbing. Similar to the first electric drive mode, the first torque transfer device (CL) connects the second electric machine (EM2) to the first planetary gear set (PG1) and disconnect the second electric machine (EM2) from the second planetary gear set (PG2). Part of the motive power is provided by the first electric machine (EM1) through the second planetary gear set (PG2). Referring to FIGS. 5 to 7, the one-way clutch (OWC) prevents the input shaft (Input) from rotating in the opposite direction to the normal rotation direction of the engine. In doing so, it provides a reaction torque to balance the drive torque of the first electric machine (EM1). The second planetary gear set (PG2) provides a torque leverage by a factor of $K_b/K_a$ to the first electric machine (EM1). Part of the motive power is provided by the second electric machine (EM2) through the first planetary gear set (PG1). The first planetary gear set (PG1) provides torque leverage by a factor $K_s+1$ to the second electric machine (EM2).

Geared Neutral and Parking

The multi-mode electro-mechanical variable speed transmission is capable of providing additional practical and useful functions including geared neutral and parking. When the clutch (CL) is disengaged from both the first and second planetary gear sets, and the first electric machine (EM1) is switched off or at the idle state, the transmission is at geared neutral. When both the first and second electric machines (EM1, EM2) are switched off or at the idle state, the transmission is also at geared neutral.

Parking can be achieved by engaging the clutch (CL) to both the first and second planetary gear sets and by engaging the brake (BR). In addition, parking can be achieved by conventional parking pawl (PBR, not shown) installed on the transmission.

Fixed Speed Ratio Operation

The multi-mode electro-mechanical variable speed transmission of the current invention is capable of offering operations with fixed output-to-input speed ratios. The fixed speed ratio operations are provided to suit special application requirements such as towing and acceleration during hill climbing. The conditions for fixed speed ratio operations are listed in the following table.

| Fixed speed-ratio mode | SL engagement status | | |
| --- | --- | --- | --- |
| | C1 | C2 | BR |
| 1 | engage | engage | disengage |
| 2 | disengage | engage | engage |

The first and second fixed speed ratios are essentially at the first and second regular speed ratio nodes (SR1, SR2) of the transmission. Shifting between adjacent fixed speed-ratio positions is achieved in a smooth and continuous fashion as outlined in previous sections. Thus, there is no power interruption during speed ratio change between the first and second fixed speed ratios. In addition, at each fixed speed ratio position, one or both of the electric machines (EM1, EM2) can act as motors or generators to provide power assisting or regenerative braking functions as in parallel electric hybrid systems. This results in enhanced power and performance of the vehicle system.

The torque transfer devices can be any type of mechanical, hydro-mechanical, or electro-magnetic clutches, brakes or combined packages of clutches and brakes. Since the engagement or disengagement of the torque transfer devices occur under natural synchronization conditions wherein the rotational speeds for all involved components are essentially the same, simple clutches such as positive engagement clutches or dog clutches can be used instead of the more complex and costly friction clutches. This eliminates the hydraulic system normally required by wet friction clutches, and thus effectively reduces internal power losses.

Other Operation Status

Embodiment 1 and its variants (Embodiment 1A, Embodiment 1B) also provide the function for starting up the engine. Engine start up is accomplished either by one of the two electric machines independently or by both electric machines working collaboratively. Fox example, when the transmission is at geared neutral, the engine can be started collaboratively by two electric machines. When the transmission is under pure electric drive mode, the engine can be started by the first electric machine (EM1).

When energy storage device (BT) is used in conjunction with the multi-mode electro-mechanical variable speed transmission, the transmission is capable of providing not only continuous speed ratio variation, but also energy buffering, offering the so-called hybrid drive operation. Under hybrid drive operation, power between the two electric machines no longer need to be balanced. The electric power generated by one electric machine may be more or less than that electric power consumed by the other electric machine. Under such circumstances, the speed ratio node at which one of the electric machines has zero rational speed may not coincide with the speed ratio at which the other electric machine has zero torque. The position of speed ratio at which one of the electric machines has zero torque varies with the power imbalance between the two electric machines. However, the position of speed ratio node at which one of the electric machines has zero speed always remains the same regardless the power imbalance between the two electric machines.

When there is net electric power exchange between the electric power path of the transmission and the energy storage device, the electric machines have to fulfill double duties of both speed ratio regulation and power regulation. Thus, the power ratings of the electric machine should not be less than the maximum electric power split ratio times the rated power at the input shaft of the transmission.

Figure 12:
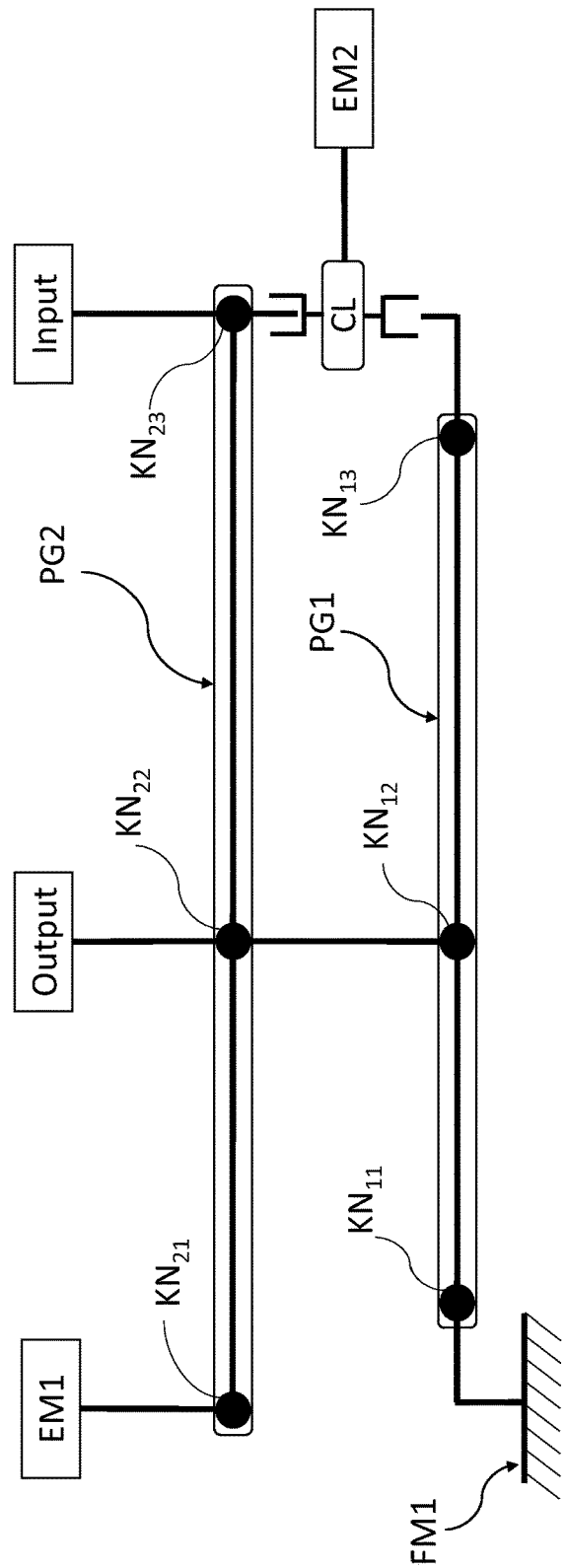
FIG. 12 is a schematic lever diagram of another preferred embodiment (embodiment 2) of multi-mode electro-mechanical variable speed transmission of the current invention.

FIG. 12 shows another embodiment (embodiment 2) in a lever diagram format. Referring to FIG. 12, the multi-mode electro-mechanical variable speed transmission is comprised of a gear system including a first planetary gear set (PG1) represented by a first lever and a second planetary gear set (PG2) represented by a second lever, an input shaft (Input), an output system (Output), a clutch (CL), a first stationary member (FM1), and first and second electric machines (EM1, EM2) along with their associated drives and controllers (not shown). The first planetary gear set is a three-branch planetary gear, having a first co-axial rotatable component, a second co-axial rotatable component and a third co-axial rotatable component each represented by a first knot ($KN_{11}$), a second knot ($KN_{12}$) and a third knot ($KN_{13}$) of the first lever, respectively. The first lever is fully defined by its characteristic parameter $K_{S1}$. The second planetary gear set is also a three-branch planetary gear set, having a first, a second, and a third co-axial rotatable components that are represented by a first knot ($KN_{21}$), a second knot ($KN_{22}$), and a third knot ($KN_{23}$) of the second lever, respectively. The second lever is fully defined by its characteristic parameter $K_{S2}$. The first knot ($KN_{11}$) of the first lever (PG1) connects to the stationary member (FM1). The second knot ($KN_{12}$) of the first lever (PG1) connects to the second knot ($KN_{22}$) of the second lever (PG2) such that the second knot ($KN_{12}$) of the first lever (PG1) rotates at the same rational speed as the second knot ($KN_{22}$) of the second lever (PG2).

The first electric machine (EM1) includes a first rotor and a first stator. The rotor of the first electric machine (EM1) directly couples to the first knot ($KN_{21}$) of the second planetary gear set (PG2). The output shaft (Output) couples to the second knot ($KN_{12}$) of the first planetary set (PG1) and to the second knot ($KN_{22}$) of the second planetary gear set (PG2). The input shaft (Input) couples to the third knot ($KN_{23}$) of the second planetary gear set (PG2).

The second electric machine (EM2) includes a second rotor and a second stator. The rotor of the second electric machine (EM2) couples selectively through the clutch (CL) to the third knot ($KN_{13}$) of the first planetary gear set (PG1) or to the third knot ($KN_{23}$) of the second planetary gear set (PG2), or to both the third knot ($KN_{13}$) of the first planetary gear set and the second planetary gear set. Thus, the second electric machine (EM2) selectively either connects directly to the third knot ($KN_{23}$) of the second planetary gear set with a first constant speed ratio (1 to 1 ratio), or connects indirectly through the first planetary gear set to the second knot ($KN_{22}$) of the second planetary gear set with a second constant speed ratio wherein the first and second constant speed ratios are different.

The first and second electric machines (EM1, EM2), along with their respective drives, are electrically connected to an energy storage device such as a battery pack (BT, not shown in illustrations) to receive power from or deliver power to the energy storage device When the second electric machine (EM2) couples to the first planetary gear set (PG1), the clutch (CL) connects the second electric machine EM2 to the third knot ($KN_{13}$) of the first planetary gear set (PG1) and disconnect the second electric machine (EM2) from the third knot ($KN_{23}$) of the second planetary gear set (PG2) as shown in FIG. 12. The transmission is operated under the first output power split mode. The input power from the engine is split into two power paths to transmit to the output system. One is the pure mechanical power path that goes from the input shaft (Input), through the second knots ($KN_{12}$, $KN_{22}$) of the first and second planetary gear sets (PG1, PG2), to the output system (Output). The other is the electro-mechanical power path that goes from input shaft (Input), through the second planetary gear set (PG2), the first electric machine (EM1), the second electric machine (EM2), the clutch (CL) and the first planetary gear set (PG1), to the output system (Output).

Figure 13:
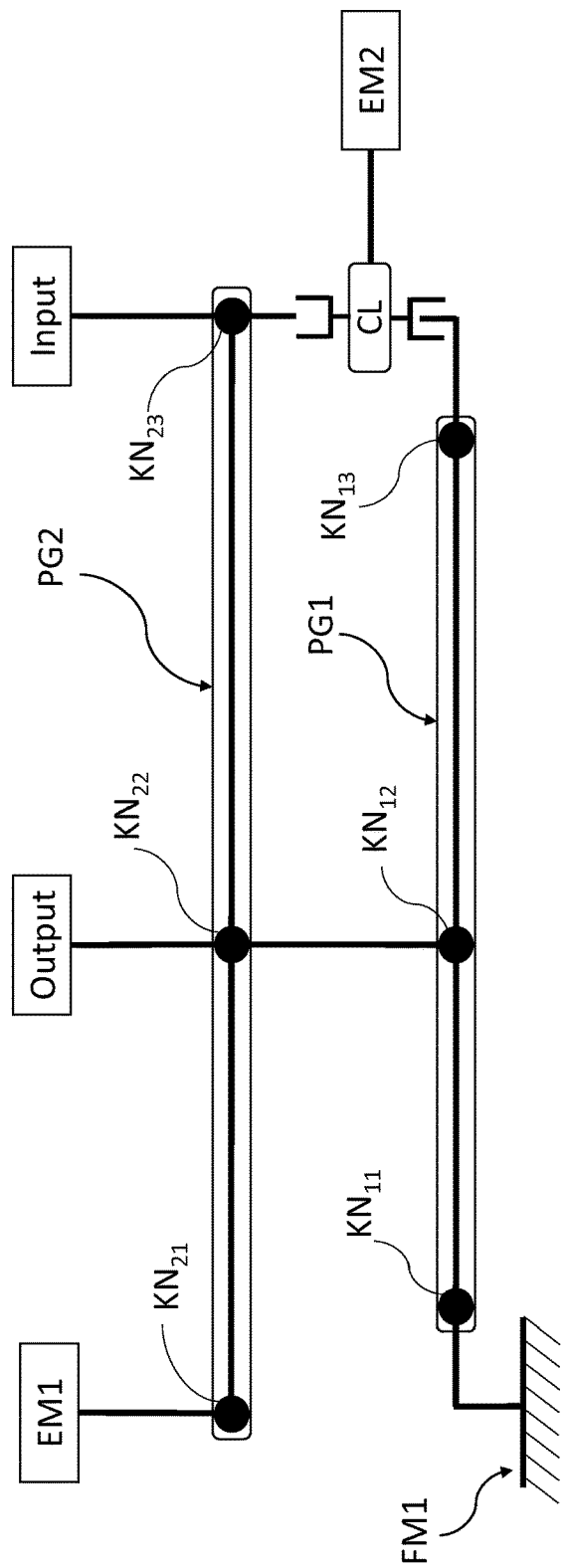
FIG. 13 is a schematic lever diagram of another preferred embodiment (embodiment 2) of multi-mode electro-mechanical variable speed transmission of the current invention

When the second electric machine (EM2) couples to the second planetary gear set (PG2), the clutch (CL) disconnects the second electric machine (EM2) from the third knot ($KN_{13}$) of the first planetary gear set (PG1) and connects it to the third knot ($KN_{23}$) of the second planetary gear set (PG2) as shown in FIG. 13. The transmission is operated under the second power split mode. Similarly, the input power from the engine is split into two power paths to transmit to the output system (Output). The pure mechanical power path goes from the input shaft (Input) through the second planetary gear set (PG2) to the output system (Output); the electro-mechanical power path goes from the input shaft (Input), through the second planetary gear set (PG2), the first electric machine (EM1), the second electric machine (EM2), and the clutch (CL) back to the second planetary gear set (PG2), and finally to the output system (Output).

The second embodiment (embodiment 2) is capable of providing a natural speed ratio node SR0 where the speed of the output shaft system is zero and a first regular speed ratio node SR1. At the regular speed ratio node SR1, at least one of the electric machines achieves zero rotational speed. The natural speed ratio node SR0 divides the entire speed ratio regime into a forward speed ratio regime and a reverse speed ratio regime. Above the natural speed ratio node is the forward regime; below the natural speed ratio node is the reverse regime. The first regular speed ratio node SR1, also simply referred to as the first speed ratio node, further divides the forward regime into a low-speed ratio regime and a high-speed ratio regime. Below the first regular speed ratio node SR1 is the low speed ratio regime and above the first regular speed ratio node SR1 is the high speed ratio regime.

At the first regular speed ratio node point SR1, the torque of the second electric machine (EM2) is zero if there is no net power exchange between the transmission and the energy storage device. Thus, it would be advantageous to choose SR1 as the switching point between the different power-split modes or configurations to avoid or minimize possible shock load in torque for the transmission. In the low speed ratio regime below SR1, the transmission adopts the so-called output power split configuration. In the high speed ratio regime above SR1, the transmission adopts the so-call input power split configuration. In the reverse regime, the hybrid system operates under pure electric drive mode. Thus, the power in each power path, whether the mechanical power path or the electro-mechanical power path, is always less than the power transmitted through the transmission from the input shaft to the output system. No internal power circulation exists in any speed ratio regime for the multi-mode electro-mechanical variable speed transmission. The speed ratio range of the transmission is thus effectively extended. To ensure speed synchronization of the clutch (CL) at the mode switching point SR1, the following relationship between the gear ratios has to be satisfied as closely as possible, $$K_{S1} = K_{S2} \quad (9)$$

Taking into consideration of possible internal power losses of the electric machines and the associated drives, and the consideration of constraints imposed by gear teeth numbers, the actual switching point $SR_b$ in speed ratio may be at the vicinity of SR1 deviating from SR1. To ensure clutch rotational speed synchronization at switching speed ratio $SR_b$, the gear ratios have to satisfy following relationship $$SR_b = \frac{1}{1 + K_{S1}} \quad (10)$$

A common feature of all the embodiments and variants is that the first electric machine (EM1), the input shaft (Input) and the output system (Output) each couples to a different knot of the second planetary gear set (PG2) with a constant speed ratio. Another common feature of all the embodiments and variants is that one knot of the first planetary gear set (PG1) is coupled to a stationary member (FM1) of the transmission. Yet, another common feature of all the embodiments and variants is that the second electric machine (EM2) selectively couples to the first planetary gear set (PG1) with a first constant speed ratio and to the second planetary gear set (PG2) with a second constant speed ratio.

The basic steps in design and producing the transmission of the current invention include constructing a planetary gear set having at least three branches; producing an input shaft, an output system, a first electric machine and a second electric machine; connecting the each of the at least three branches of the planetary gear set to the first electric machine, the output system and the input shaft, respectively; and selectively connecting the second electric machine to one branch of the planetary gear set with a first constant speed ratio and to another branch of the planetary gear set with a second constant speed ratio.

When four-branch planetary gear set is used to construct transmission of the current invention, restrictions are imposed on the structure and the characteristic parameters of the four-branch gear system. This is done to ensure that the four-branch gear system so constructed is suitable to produce a multi-mode electro-mechanical variable speed transmission that is capable of satisfying all specified functional requirements. The aforementioned inequality Equation (8) set forth the power constraints for electric machines from the power matching perspective. It is recommended that following condition be satisfied when designing and selecting characteristic parameters for a four-branch gear system.

$$\frac{K_b(K_a + 1)}{K_b - K_a} \le 2.75 \quad (11)$$

Additionally, for restricting the rotational speed of electric machines, particularly at high speed regime, it is further recommended that the following relationship holds true.

$$K_b \le 2 \quad (12)$$

It should be pointed out that the electric machine referred in this disclosure is a generic term; it refers to both electric motor and electric generator.

INDUSTRIAL USEFULNESS

The parts and components required by the aforementioned embodiments and variants of current invention can be readily made by industrial manufacturing means. This warrants that the multi-mode electro-mechanic variable speed transmission is obtainable by a person of ordinary skill in the art based on the above teachings. The transmission can be operated under at least two different power split modes, and thus is capable of avoiding internal power circulation and offering higher power transmission efficiency. The transmission can provide, in a wide range, independent and continuous output to input speed ratio change and power regulation, extending significantly operation range. The new multi-mode electro-mechanical variable speed transmission reduces power demand on electric machines, making the construction of the transmission simple, more compact, and low cost. The transmission is capable of proving continuous speed change from reverse to full stop and to forward, without the need for vehicle launching device. It significantly improves the overall fuel efficiency of the vehicle.

The invention claimed is:

1. A multi-mode electro-mechanical variable speed transmission comprising:
   a gear system, an input shaft, an output system, a first electric machine, a second electric machine; and a first torque transfer device;

said gear system including a second planetary gear set having coaxial components including a first co-axial rotatable component, a second co-axial rotatable component, and a third co-axial rotatable component;

said output system including at least one drive shaft;

said first electric machine connecting to the first co-axial rotatable component of the at least one planetary gear set with a constant speed ratio;

said output system being connected to the second co-axial rotatable component of the at least one planetary gear set with a constant speed ratio;

said input shaft being connected to the third co-axial rotatable component of the at least one planetary gear set with a constant speed ratio; and said second electric machine being selectively connectable through said first torque transfer device to one of the co-axial components of the second planetary gear set with a first constant speed ratio, and to another of the co-axial components of the second planetary gear set with a second constant speed ratio, wherein the first and second constant speed ratios are different.

2. The multi-mode electro-mechanical variable speed transmission according to claim 1, further comprising a first planetary gear set, the second electric machine selectively couples in a direct connection to the one of the co-axial rotatable components of the second planetary gear set with the first constant speed ratio, and in an indirect connection through the first planetary gear set to the another of the co-axial rotatable components of the second planetary gear set with the second constant speed ratio; the first constant speed ratio and the second constant speed ratio are different.

3. The multi-mode electro-mechanical variable speed transmission according to claim 2, wherein said second planetary gear set is a four-branch planetary gear set having the first co-axial rotatable component, the second co-axial rotatable component, the third co-axial rotatable component and a fourth co-axial rotatable component; the second electric machine selectively couples in a direct connection to the fourth co-axial rotatable component of the four-branch planetary gear set with the first constant speed ratio, and in an indirect connection through said first planetary gear set to the second co-axial rotatable component of the four-branch planetary gear set with the second speed ratio.

4. The multi-mode electro-mechanical variable speed transmission according to claim 3, further comprising a first stationary member; said first planetary gear set is a three-branch planetary gear set having a first co-axial rotatable component, a second co-axial rotatable component, and a third co-axial rotatable component; the first co-axial rotatable component of the three-branch planetary gear set couples to the first stationary member; the second co-axial rotatable component of the three-branch planetary gear set couples to the second co-axial rotatable component of the four-branch planetary gear set; the second electric machine selectively couples to the third co-axial rotatable component of the three-branch planetary gear set and to the fourth co-axial rotatable component of the four-branch planetary gear set through said first torque transfer device through said first torque transfer device.

5. The multi-mode electro-mechanical variable speed transmission according to claim 4, further comprising a second torque transfer device and a second stationary member; the second torque transfer device selectively couples the input shaft and the third co-axial rotatable component of the four-branch planetary gear set to the second stationary member.

6. The multi-mode electro-mechanical variable speed transmission according to claim 5, further comprising a third torque transfer device and a third stationary member; the third torque transfer device selectively couples the fourth co-axial rotatable component of the four-branch planetary gear set to the third stationary member.

7. The multi-mode electro-mechanical variable speed transmission according to claim 5, wherein the first torque transfer device is a dog-clutch having at least two engagement positions; the second torque transfer device is a one-way clutch capable of providing reaction torque to said at least one planetary gear set and preventing the input shaft from rotating in reverse direction.

8. The multi-mode electro-mechanical variable speed transmission according to claim 3, wherein said four-branch planetary gear set can be represented by a four-knot lever diagram, wherein the inter-distance between the first and $3^{rd}$ knots measures ($K_b$) units of length, the inter-distance between the second and $3^{rd}$ knots measures ($K_a$) units of length, the inter-distance between the third and the $4^{th}$ knots is one unit of length, and the four-branch planetary gear set satisfies the following relationship:

$$\frac{K_b(K_a+1)}{K_b-K_a} \leq \left(\frac{1+\frac{P_{em}}{P_{in}}}{1-\frac{P_{em}}{P_{in}}}\right)^2$$

where:
$P_{em}$ is a maximum continuous power rating of said first electric machine and said second electric machine; and
$P_{in}$ is a maximum power at the input shaft.

9. The multi-mode electro-mechanical variable speed transmission according to claim 8, wherein said first planetary gear set is three-branch planetary gear set and can be represented by a three-knot lever diagram, wherein the inter-distance between the first and $2^{nd}$ knot measures one unit of length; the inter-distance between the second and $3^{rd}$ knots measures ($K_s$) units of length, and the three-branch planetary gear set and the four-branch planetary gear set satisfy one of the following relationships:

$$K_s = \frac{K_a+1}{K_b-K_a},$$

$$K_s = K_b.$$

10. The multi-mode electro-mechanical variable speed transmission according to claim 9, wherein the characteristic parameters of the four-branch planetary gear set ($K_a$) and ($K_b$) satisfy following relationships, $$\frac{K_b(K_a+1)}{K_b-K_a} \leq 2.75;$$

$$K_b \leq 2.$$

11. The multi-mode electro-mechanical variable speed transmission according to claim 2, wherein said first planetary gear set and said second planetary gear set are co-axially aligned and positioned adjacent to each other along an axial direction.

12. The multi-mode electro-mechanical variable speed transmission according to claim 1, wherein said first torque transfer device has at least four engagement positions; and said engagement positions are aligned adjacent to each other along an axial direction.

13. A multi-mode electro-mechanical variable speed transmission, comprising:
a gear system, an output system, an input shaft, a first electric machine, a second electric machine, a first torque transfer device and a first stationary member;
said gear system including a first planetary gear set and a second planetary gear set, each having at least a first co-axial rotatable component, a second co-axial rotatable component, and a third co-axial rotatable component; one of the co-axial rotatable components of the first planetary gear set couples to the first stationary member and another co-axial rotatable component of the first planetary gear set couples to a co-axial rotatable component of the second planetary gear set;
the output system including at least one drive shaft;
the first electric machine being connected to the first co-axial rotatable component of the second planetary gear set with a constant speed ratio;
the output system being connected to the second co-axial rotatable component of the second planetary gear set with a constant speed ratio;
the input shaft being connected to the third co-axial rotatable component of the second planetary gear set with a constant speed ratio; and
the second electric machine is selectively connectable through the first torque transfer device to one co-axial component of the second planetary gear set with a first constant speed ratio, and to another co-axial component of the second planetary gear set via the first planetary gear set with a second constant speed ratio, wherein the first constant speed ratio and the second constant speed ratio are different.

14. A method of designing, producing and operating the multi-mode electro-mechanical variable speed transmission of claim 13, the method includes:
providing a gear system having a first planetary gear set and a second planetary gear set, each including at least a first co-axial rotatable component, a second co-axial rotatable component, and a third co-axial rotatable component;
providing an input shaft, an output system, a first electric machine, a second electric machine, a first stationary member and a first torque transfer device;
coupling the first co-axial rotatable component of the first planetary gear set to the first stationary member;
coupling the second co-axial rotatable component of the first planetary gear set to the second co-axial rotatable component of the second planetary gear set;
coupling the first co-axial rotatable component of the second planetary gear set to the first electric machine;
coupling the second co-axial rotatable component of the second planetary set to the output system;
coupling the third co-axial rotatable component of the second planetary set to the input shaft;
coupling the second electric machine selectively through the first torque device to one of the co-axial components of the first planetary gear set and to one of the co-axial rotatable components of the second planetary gear set; and
operating the multi-mode electro-mechanical variable speed transmission in at least two different power split modes based on a predetermined speed ratio of the two co-axial rotatable components of the second planetary gear set that connect to the output system and the input shaft, respectively.

15. The method according to claim 14, wherein the first planetary gear set is represented by a first lever diagram having at least three knots, the inter-distance between the first and second knots measured one unit, and the inter-distance between the second and third knots measures $K_s$ units;
wherein the second planetary gear set is represented by a second lever diagram having at least four knots; the inter-distance between the first and third knots measures $K_b$ units, the inter-distance between the second and third knots measures $K_a$ units, and the inter-distance between the third and fourth knots measures one unit; and
wherein the predetermined speed ratio $SR_b$ is the input to output speed ratio of the gear system and is determined as $$SR_b = \frac{K_a + 1}{K_a(K_s + 1) + 1}.$$

16. The method according to claim 14, wherein the first planetary gear set is represented by a first lever diagram having at least three knots, the inter-distance between the first and second knots measures one unit, the inter-distance between the second and third knots measures $K_{S1}$ units;
wherein the second planetary gear set is represented by a second lever diagram having at least three knots; the inter-distance between the first and second knots measures one unit, the inter-distance between the second and the third knots measures $K_{S2}$ units; and
wherein the predetermined speed ratio $SR_b$ is an input to output speed ratio of the gear system and is determined as $$SR_b = \frac{1}{1 + K_{S1}}.$$

17. The method according to claim 14, wherein the second planetary gear includes a fourth co-axial rotatable component; and the step of coupling the second electric machine includes coupling the second electric machine selectively through the first torque device to the third co-axial component of the first planetary gear set or to the fourth co-axial rotatable component of the second planetary gear set.

18. The method according to claim 14, wherein the step of coupling the second electric machine includes coupling the second electric machine selectively through the first torque device to the third co-axial component of the first planetary gear set or to the third co-axial rotatable component of the second planetary gear set.

19. The method according to claim 14, further comprising the steps of arranging and aligning the first planetary gear set, the second planetary gear set, and the first torque transfer device along a same rotational axis; and arranging and aligning the first electric machine and the second electric machine along the same rotational axis.

20. The method according to claim 14, wherein the first torque transfer device is provided with at least four engagement positions arranged adjacent to each other along an axial direction.

21. The multi-mode electro-mechanical variable speed transmission according to claim 13, wherein the second planetary gear set includes a fourth co-axial rotatable component, the first co-axial rotatable component of the first planetary gear set couples to the first stationary member, the second co-axial rotatable component of the first planetary gear set couples to the second co-axial rotatable component of the second planetary gear set, and the second electric machine is selectively connectable through the first torque transfer device to the third co-axial component of the first planetary gear set, and to the fourth co-axial component of the second planetary gear set.

22. The multi-mode electro-mechanical variable speed transmission according to claim 13, further comprising a second torque transfer device; said first and second planetary gear sets, said first and second torque transfer devices, and said first and second electric machines being arranged on a same rotational axis, the first and second planetary gear set being arranged adjacent to each other along axial direction, and the first torque transfer device, the first planetary gear set, and second planetary gear sets are sandwiched between the two electric machines.

23. The multi-mode electro-mechanical variable speed transmission according to claim 13, wherein the first torque transfer device has a first engagement position in which the torque transfer device couples the second electric machine to a co-axial rotatable component of the first planetary gear set; a second engagement position in which the first torque transfer device couples the second electric machine to a co-axial rotatable component of the first planetary gear set and a coaxial rotatable component of the second planetary gear set; a third engagement position in which the first torque transfer device couples the second electric machine to the one co-axial component of the second planetary gear set; and a fourth engagement position in which the first torque transfer device couples the second electric machine to the another co-axial component of the second planetary gear set via the first planetary gear set and to another stationary member of the transmission.

* * * * *